(12) United States Patent
Liu et al.

(10) Patent No.: US 12,113,659 B2
(45) Date of Patent: Oct. 8, 2024

(54) SIGNAL TRANSMISSION METHOD, DEVICE, AND SYSTEM

(71) Applicant: HUAWEI TECHNOLOGIES CO., LTD., Guangdong (CN)

(72) Inventors: Fengwei Liu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 17/403,119

(22) Filed: Aug. 16, 2021

(65) Prior Publication Data

US 2022/0078067 A1     Mar. 10, 2022

Related U.S. Application Data

(63) Continuation of application No. 16/676,926, filed on Nov. 7, 2019, now Pat. No. 11,095,492, which is a
(Continued)

(30) Foreign Application Priority Data

Aug. 25, 2017    (CN) .......................... 201710740988.9

(51) Int. Cl.
*H04L 27/36*       (2006.01)
*H04L 1/1812*      (2023.01)
(Continued)

(52) U.S. Cl.
CPC ............ *H04L 27/36* (2013.01); *H04L 1/1812* (2013.01); *H04L 5/0007* (2013.01); *H04L 27/04* (2013.01);
(Continued)

(58) Field of Classification Search
CPC ..... H04L 27/36; H04L 1/1812; H04L 5/0007; H04L 27/04; H04L 27/20; H04W 72/21
See application file for complete search history.

(56) References Cited

U.S. PATENT DOCUMENTS

2009/0196366 A1    8/2009   Shen et al.
2011/0255619 A1   10/2011   Nam et al.
(Continued)

FOREIGN PATENT DOCUMENTS

CN         101902301       12/2010
CN         101902301 A    12/2010
(Continued)

OTHER PUBLICATIONS

3GPP TS 36.212 V14.2.0 (Mar. 2017), "3rd Generation Partnership Project; Technical Specification Group Radio Access Network; Evolved Universal Terrestrial Radio Access (E-UTRA); Multiplexing and channel coding (Release 14)," Mar. 2017, 197 pages.
(Continued)

*Primary Examiner* — Ronald B Abelson
(74) *Attorney, Agent, or Firm* — Fish & Richardson P.C.

(57) ABSTRACT

This application discloses a signal transmission method, including: obtaining, by a terminal device, to-be-transmitted data, uplink control information, and a demodulation reference signal; mapping the to-be-transmitted data, the uplink control information, and the demodulation reference signal to generate multiplexed symbols. The multiplexed symbols include DFT-s-OFDM symbols or OFDM symbols. N first multiplexed symbols are located on one side or two sides of a second multiplexed symbol. A location relationship between each of the N first multiplexed symbols and the second multiplexed symbol satisfies a mapping condition. N is an integer greater than or equal to 1. The first multiplexed symbol is a multiplexed symbol to which the uplink control information is mapped, and the second multiplexed symbol
(Continued)

is a multiplexed symbol to which the demodulation reference signal is mapped.

18 Claims, 14 Drawing Sheets

Related U.S. Application Data continuation of application No. PCT/CN2018/102365, filed on Aug. 25, 2018.

(51) Int. Cl.
   *H04L 5/00* (2006.01)
   *H04L 27/04* (2006.01)
   *H04L 27/20* (2006.01)
   *H04W 72/21* (2023.01)

(52) U.S. Cl.
   CPC ............. *H04L 27/20* (2013.01); *H04W 72/21* (2023.01); *H04L 5/0048* (2013.01)

(56) References Cited

U.S. PATENT DOCUMENTS

| | | | |
|---|---|---|---|
| 2012/0275417 | A1 | 11/2012 | Gong et al. |
| 2012/0320872 | A1 | 12/2012 | Yang et al. |
| 2013/0022017 | A1 | 1/2013 | Han et al. |
| 2014/0056273 | A1* | 2/2014 | Jang .................. H04L 1/0026 |
| 2014/0269249 | A1 | 9/2014 | Bai et al. |
| 2015/0249984 | A1 | 9/2015 | Papasakellariou et al. |
| 2016/0278075 | A1 | 9/2016 | Yang et al. |
| 2017/0181141 | A1 | 6/2017 | Noh et al. |
| 2017/0374658 | A1 | 12/2017 | Kim et al. |
| 2018/0310298 | A1 | 10/2018 | Li et al. |
| 2019/0097853 | A1* | 3/2019 | Suzuki .................. H04L 27/26 |
| 2019/0261383 | A1* | 8/2019 | Kwak ............... H04W 72/0446 |

FOREIGN PATENT DOCUMENTS

| | | |
|---|---|---|
| CN | 101902313 | 12/2010 |
| CN | 102055519 A | 5/2011 |
| CN | 102056313 A | 5/2011 |
| CN | 102315897 | 1/2012 |
| CN | 102783110 A | 11/2012 |
| CN | 103139125 | 6/2013 |
| CN | 103152091 | 6/2013 |
| CN | 103222223 | 7/2013 |
| CN | 104885390 A | 9/2015 |
| CN | 105144618 A | 12/2015 |
| CN | 106027204 | 10/2016 |
| CN | 106067845 A | 11/2016 |
| CN | 106257856 | 12/2016 |
| CN | 106464455 A | 2/2017 |
| CN | 107113147 | 8/2017 |
| EP | 2945310 | 11/2015 |
| JP | 2013530563 | 7/2013 |
| KR | 20140018258 | 2/2014 |
| WO | 2010055387 | 5/2010 |

OTHER PUBLICATIONS

3GPP TS 38.211 V0.1.3 (Aug. 2017), "3rd Generation Partnership Project; Technical Specification Group Radio Access Network; NR; Physical channels and modulation (Release 15)," Aug. 2017, 30 pages.

3GPP TS 38.212 V0.0.2 (Aug. 2017), "3rd Generation Partnership Project; Technical Specification Group Radio Access Network; NR; Multiplexing and channel coding (Release 15)," Aug. 2017, 22 pages.

Ericsson, "Transmission of ACK/NAK on PUSCH for LTE TDD," TSG-RAN WG1 #54, R1 -083371, Jeju, South Korea, Aug. 18-22, 2008, 6 pages.

Extended European Search Report issued in European Application No. 18847398.7 dated Mar. 30, 2020, 11 pages.

Huawei, "Introduction of shortened processing time and shortened TTI into 36.212," 3GPP TSG RAN WG1 Meeting #90, R1 -1714171, Prague, Czech, Aug. 21-25, 2017, 36 pages.

Huawei, HiSilicon, "UCI for NB-IoT ," 3GPP TSG RAN WG1 Meeting #84, R1-160324, St Julian's, Malta, Feb. 15-19, 2016, 5 pages.

Issue Notification issued in Chinese Application No. 201810872164.1 dated Sep. 29, 2019, 5 pages (with English translation).

Notice of Allowance issued in Chinese Application No. 201810872164.1 dated Sep. 29, 2019, 1 page.

Office Action in Japanese Application No. 2019565508, dated Jan. 12, 2021, 8 pages.

Office Action issued in Chinese Application No. 201810872164.1 dated May 5, 2019, 17 pages (with English translation).

Office Action issued in Korean Application No. 2019-7033696 dated Nov. 23, 2020, 9 pages (with English translation).

PCT International Search Report and Written Opinion issued in International Application No. PCT/CN2018/102365 dated Nov. 26, 2018, 11 pages (partial English translation).

Qualcomm Europe , "Limiting the constellation size of ACK transmissions in PUSCH," 3GPP TSG-RAN WG1 #52bis, R1-081488, Shenzhen, China, Mar. 31-Apr. 4, 2008, 3 pages.

Search Report issued in Chinese Application No. 201810872164.1 dated Nov. 1, 2018, 6 pages.

Xie et al., "An optimization on GLRT-based detection for LTE PUCCH," IEEE/CIC ICCC 2015 Symposium on Communication and Control Theory, Nov. 2015, 5 pages.

ZTE, "Uplink HARQ ACK transmission for NB-IoT," 3GPP TSG RAN WG1 Meeting #84, R1-160479, St Julian's, Malta, Feb. 15-19, 2016, 4 pages.

Han et al., "A New Method for PAR Reduction in OFDM via Improved Constellation Extension," Journal of Nanjing Institute of Posts and Telecommunications, vol. 25, No. 5, Oct. 2005, 5 pages (with English abstract).

Yuan, "Research on Application Technology of Network Coding in LTE Network," Thesis for the degree of Master, University of Electronic Science and Technology, Apr. 1, 2012, 1 page (with English abstract).

IEEE Std 1901-2010, "IEEE Standard for Broadband over Power Line Networks: Medium Access Control and Physical Layer Specifications," Dec. 30, 2010, 1586 pages.

Office Action in Chinese Appln. No. 201710740988.9, dated Apr. 29, 2023, 7 pages.

* cited by examiner

SIGNAL TRANSMISSION METHOD, DEVICE, AND SYSTEM

CROSS-REFERENCE TO RELATED APPLICATIONS

This application is a continuation of U.S. patent application Ser. No. 16/676,926, filed on Nov. 7, 2019, now U.S. Pat. No. 11,095,492, which is a continuation of International Application No. PCT/CN2018/102365, filed on Aug. 25, 2018. The International Application claims priority to Chinese Patent Application No. 201710740988.9, filed on Aug. 25, 2017. All of the afore-mentioned patent applications are hereby incorporated by reference in their entireties.

TECHNICAL FIELD

This application relates to the field of communications technologies, and specifically, to a signal transmission method, a device, and a system.

BACKGROUND

Orthogonal frequency division multiplexing (OFDM) and discrete Fourier transform spread orthogonal frequency division multiplexing (DFT-s-OFDM) are two typical waveforms in wireless communication.

The OFDM is a multi-carrier waveform and has advantages such as a strong anti-multipath capability and flexible frequency division multiplexing modes. However, a disadvantage of the OFDM is an excessively high peak to average power ratio (PAPR). The DFT-s-OFDM incorporates discrete Fourier transform (DFT) spread before inverse fast Fourier transform (IFFT) of the OFDM, and provides a PAPR far lower than that of the OFDM while inheriting the plurality of advantages of the OFDM. Although the DFT-s-OFDM incorporates a subcarrier processing procedure of the OFDM, the DFT-s-OFDM is essentially a single-carrier waveform.

Currently, both the OFDM waveform and the DFT-s-OFDM waveform are used in an uplink in a new-generation wireless communication standard: new radio (NR). The OFDM waveform can provide a higher capacity in a scenario of a high signal-to-noise ratio, and is applicable to cell center users. However, the DFT-s-OFDM waveform is featured by a low PAPR and can increase output power of a power amplifier, and therefore can provide a larger coverage area and is applicable to cell edge users with limited coverage. A terminal device supports both the OFDM waveform and the DFT-s-OFDM waveform, and a network side determines a waveform used during each transmission.

In a long term evolution (LTE) system, uplink data is sent through a physical uplink shared channel (PUSCH), and uplink control information (UCI) is usually sent through a physical uplink control channel (PUCCH). To retain the low-PAPR feature of the DFT-s-OFDM, data cannot be simultaneously transmitted through the PUCCH and the PUSCH. Therefore, in LTE, when the uplink data and the UCI need to be simultaneously transmitted, the UCI may be mapped to the PUSCH channel and then transmitted together with the uplink data. However, this transmission mode degrades uplink data transmission performance. A PAPR increases when uplink data is transmitted on a PUSCH channel together with some reference signals such as a demodulation reference signal (DMRS) transmitted in an NR network.

SUMMARY

To resolve a prior-art problem that uplink data performance is affected when uplink data is transmitted on a physical uplink shared channel together with a demodulation reference signal or uplink control information, embodiments of this application provide a signal transmission method, so as to ensure that a PAPR of uplink data does not increase when uplink data is transmitted on a physical uplink shared signal together with a demodulation reference signal, and improve demodulation performance when uplink data is transmitted on a physical uplink shared signal together with uplink control information. The embodiments of this application further provide a corresponding device, a chip system, a computer readable storage medium, and a signal transmission system.

According to a first aspect of this application, a signal transmission method is provided, including: obtaining, by a terminal device, to-be-transmitted data, uplink control information, and a demodulation reference signal, where the to-be-transmitted data and the uplink control information may be bit data streams, the terminal device may be a device such as a mobile phone, a tablet computer, or a watch phone, the to-be-transmitted data is uplink data, the uplink control information UCI may include a channel quality indication (CQI), a precoding matrix indicator (PMI), channel state information (CSI), a channel state information reference signal resource indication (CRI), a rank indicator (RI), and a hybrid automatic repeat request (HARQ) indication, and certainly, the UCI is not limited to the several types of information listed herein and may alternatively be other information used for uplink control; mapping, by the terminal device, the to-be-transmitted data, the uplink control information, and the demodulation reference signal to generate multiplexed symbols, where the multiplexed symbols include discrete Fourier transform spread orthogonal frequency division multiplexing DFT-s-OFDM symbols or orthogonal frequency division multiplexing OFDM symbols, N first multiplexed symbols are located on one side or two sides of a second multiplexed symbol, a location relationship between each of the N first multiplexed symbols and the second multiplexed symbol satisfies a mapping condition, N is an integer greater than or equal to 1, the first multiplexed symbol is a multiplexed symbol to which the uplink control information is mapped, and the second multiplexed symbol is a multiplexed symbol to which the demodulation reference signal is mapped; and transmitting, by the terminal device, the multiplexed symbols on a physical uplink shared channel. In addition, in the first aspect, the mapping rule may be used for some UCI, for example, the mapping rule is used for the HARQ indication and the RI in the UCI, and the mapping rule may be used or not used for other UCI. It can be learned from the first aspect that the location relationship between the multiplexed symbol to which the UCI is mapped and the multiplexed symbol to which the DMRS is mapped needs to satisfy the mapping condition. In this way, UCI demodulation performance can be improved.

With reference to the first aspect, in a first possible implementation, that a location relationship between each of the N first multiplexed symbols and the second multiplexed symbol satisfies a mapping condition includes: the N first multiplexed symbols are multiplexed symbols closest to the second multiplexed symbol. In the first possible implementation of the first aspect, the multiplexed symbol to which the UCI is mapped is located on one side or two sides of the multiplexed symbol to which the DMRS is mapped, and is a multiplexed symbol closest to the multiplexed symbol to which the DMRS is mapped. For example, the DMRS is mapped to the $3^{rd}$ multiplexed symbol. If N=2, and the first multiplexed symbols are located on two sides of the second multiplexed symbol, the first multiplexed symbols are the $2^{nd}$ and the $4^{th}$ multiplexed symbols; or if the first multiplexed symbols are located on one side of the second multiplexed symbol, the first multiplexed symbols may be the $4^{th}$ multiplexed symbol and the $5^{th}$ multiplexed symbol, or certainly, may be the $1^{st}$ multiplexed symbol and the $2^{nd}$ multiplexed symbol. It can be learned that the multiplexed symbol to which the UCI is mapped is close to the multiplexed symbol to which the DMRS is mapped. This helps quickly demodulate the UCI, so as to improve UCI demodulation performance.

With reference to the first aspect or the first possible implementation of the first aspect, in a second possible implementation, the method further includes: obtaining, by the terminal device, a phase tracking reference signal (PTRS), where the phase tracking signal is further mapped to the multiplexed symbols; and that a location relationship between each of the N first multiplexed symbols and the second multiplexed symbol satisfies a mapping condition includes: the N first multiplexed symbols are multiplexed symbols to which the phase tracking signal is mapped and that are closest to the second multiplexed symbol. In the second possible implementation of the first aspect, when the PTRS is further mapped to the multiplexed symbols, the UCI needs to be mapped to the multiplexed symbol including the PTRS, and the multiplexed symbol to which the UCI needs to be mapped needs to be closest to the multiplexed symbol to which the DMRS is mapped. Certainly, a mapping sequence for mapping the UCI and the PTRS is not limited in this embodiment of this application. A modulated symbol, in the multiplexed symbol, to which the PTRS needs to be mapped may be first determined, then the modulated symbol is reserved, and then the UCI is mapped to another modulated symbol in the multiplexed symbol. For example, the DMRS is mapped to the $3^{rd}$ multiplexed symbol, and the PTRS is mapped to the $1^{st}$, the $3^{rd}$, the $5^{th}$, the $7^{th}$, and the $9^{th}$ multiplexed symbols. If N=2, and the first multiplexed symbols are located on two sides of the second multiplexed symbol, because the DMRS is fully mapped to the $3^{rd}$ multiplexed symbol, the $1^{st}$ and the $5^{th}$ multiplexed symbols are closest to the $3^{rd}$ multiplexed symbol, and the UCI is mapped to the $1^{st}$ and the $5^{th}$ multiplexed symbols; or if the first multiplexed symbols are located on one side of the second multiplexed symbol, the UCI is mapped to the $5^{th}$ and the $7^{th}$ multiplexed symbols. It can be learned that the UCI is mapped to a multiplexed symbol to which the PTRS is mapped and that is closest to the multiplexed symbol to which the DMRS is mapped. This helps quickly demodulate the UCI, so as to improve UCI demodulation performance.

With reference to the first aspect or the first or the second possible implementation of the first aspect, in a third possible implementation, the first multiplexed symbol includes a plurality of modulated symbols, the plurality of modulated symbols include uplink control information modulated symbols and data modulated symbols, and the data modulated symbols include a modulated symbol to which the to-be-transmitted data is mapped, or the data modulated symbols include a modulated symbol to which the to-be-transmitted data is mapped and a modulated symbol to which the phase tracking reference signal is mapped; and when the multiplexed symbols are the OFDM symbols, the uplink control information modulated symbols are distributed in the plurality of modulated symbols at a uniform spacing. In the third possible implementation of the first aspect, the UCI modulated symbols in the OFDM multiplexed symbols are distributed at a uniform spacing. This uniform-spacing distribution manner may also be used for UCI modulated symbols in the DFT-s-OFDM symbols, or certainly, another distribution manner may be used for UCI modulated symbols in the DFT-s-OFDM symbols. It can be learned that in the third possible implementation, a frequency-domain diversity gain can be improved, so as to improve demodulation performance. In addition, a same discrete mapping pattern design is used for DFT-s-OFDM and OFDM, so as to reduce protocol complexity.

With reference to the first aspect or the first, the second, or the third possible implementation of the first aspect, in a fourth possible implementation, the method may further include: determining, by the terminal device, a modulation scheme for the uplink control information based on a modulation scheme for the to-be-transmitted data; and respectively modulating, by the terminal device, the to-be-transmitted data and the uplink control information based on the modulation scheme for the to-be-transmitted data and the modulation scheme for the uplink control information. It can be learned from the fourth possible implementation of the first aspect that determining the modulation scheme for the uplink control information based on the modulation scheme for the to-be-transmitted data can maintain a low PAPR of the to-be-transmitted data and improve demodulation performance.

With reference to the fourth possible implementation of the first aspect, in a fifth possible implementation, the determining, by the terminal device, a modulation scheme for the uplink control information based on a modulation scheme for the to-be-transmitted data includes: if the multiplexed symbols are the DFT-s-OFDM symbols, when the to-be-transmitted data is modulated in a manner of $\pi/2$ binary phase shift keying BPSK, the modulation scheme for the uplink control information is the $\pi/2$ BPSK; or if the multiplexed symbols are the OFDM symbols, when the to-be-transmitted data is modulated in a manner of quadrature amplitude modulation (QAM), a modulation scheme for first-type information in the uplink control information is quadrature phase shift keying (QPSK), where the first-type information includes at least one of a rank indicator (RI) and a hybrid automatic repeat request (HARQ) indication. If the multiplexed symbols are the DFT-s-OFDM symbols, when the to-be-transmitted data is not modulated in the manner of the $\pi/2$ BPSK, the modulation scheme for the uplink control information may be the QPSK. The UCI may include the first-type information and second-type information. The first-type information may include an RI and a HARQ indication. The second-type information may include a CQI, a PMI, CSI, a CRI, and the like. The HARQ indication is HARQ information with a bit quantity less than a specific bit quantity, for example, the HARQ information includes 1 bit or 2 bits. The RI information is also RI information with a bit quantity less than a specific bit quantity, for example, the RI information includes 1 bit or 2 bits. The QAM includes 16QAM, 64QAM, 256QAM, and the like. The QPSK is a standard-preset QPSK constellation diagram, and may be different from an outermost constellation point of the QAM. A data modulation scheme may be further indicated by a modulation order, for example, modulation orders $Q_m$ 1, 2, 4, 6, and 8 respectively corresponding to the $\pi/2$-BPSK, the QPSK, the 16QAM, the 64QAM, and the 256QAM. It can be learned from the fifth possible implementation of the first aspect that a PAPR of the to-be-transmitted data may not increase when the modulation scheme for the uplink control information is the π/2 BPSK, and modulation robustness can be improved when the modulation scheme for the first-type information in the uplink control information is the quadrature phase shift keying QPSK.

According to a second aspect of this application, a signal transmission method is provided, including: receiving, by a network device, multiplexed symbols sent by a terminal device, where the multiplexed symbols include discrete Fourier transform spread orthogonal frequency division multiplexing DFT-s-OFDM symbols or orthogonal frequency division multiplexing OFDM symbols, N first multiplexed symbols are located on one side or two sides of a second multiplexed symbol, a location relationship between each of the N first multiplexed symbols and the second multiplexed symbol satisfies a mapping condition, N is an integer greater than or equal to 1, the first multiplexed symbol is a multiplexed symbol to which uplink control information is mapped, and the second multiplexed symbol is a multiplexed symbol to which a demodulation reference signal is mapped; and obtaining, by the network device from the multiplexed symbols through demodulation, data, the uplink control information, and the demodulation reference signal that are transmitted by the terminal device. The uplink control information UCI may include at least one of a CQI, a PMI, an RI, a HARQ indication, CSI, and a CRI. Certainly, the UCI is not limited to the several types of information listed herein and may alternatively be other information used for uplink control. It can be learned from the second aspect that the location relationship between the multiplexed symbol to which the UCI is mapped and the multiplexed symbol to which the DMRS is mapped needs to satisfy the mapping condition. In this way, UCI demodulation performance can be improved.

With reference to the second aspect, in a first possible implementation, that a location relationship between each of the N first multiplexed symbols and the second multiplexed symbol satisfies a mapping condition includes: the N first multiplexed symbols are multiplexed symbols closest to the second multiplexed symbol. In the first possible implementation of the second aspect, the multiplexed symbol to which the UCI is mapped is located on one side or two sides of the multiplexed symbol to which the DMRS is mapped, and is a multiplexed symbol closest to the multiplexed symbol to which the DMRS is mapped. For example, the DMRS is mapped to the $3^{rd}$ multiplexed symbol. If N=2, and the first multiplexed symbols are located on two sides of the second multiplexed symbol, the first multiplexed symbols are the $2^{nd}$ and the $4^{th}$ multiplexed symbols; or if the first multiplexed symbols are located on one side of the second multiplexed symbol, the first multiplexed symbols may be the $4^{th}$ multiplexed symbol and the $5^{th}$ multiplexed symbol, or certainly, may be the $1^{st}$ multiplexed symbol and the $2^{nd}$ multiplexed symbol. It can be learned that the multiplexed symbol to which the UCI is mapped is close to the multiplexed symbol to which the DMRS is mapped. This helps quickly demodulate the UCI, so as to improve UCI demodulation performance.

With reference to the second aspect or the first possible implementation of the second aspect, in a second possible implementation, that a location relationship between each of the N first multiplexed symbols and the second multiplexed symbol satisfies a mapping condition includes: the N first multiplexed symbols are multiplexed symbols to which a phase tracking signal is mapped and that are closest to the second multiplexed symbol; and the method further includes: obtaining, by the network device, the phase tracking signal from the multiplexed symbols through demodulation. In the second possible implementation of the second aspect, when the PTRS is further mapped to the multiplexed symbols, the UCI needs to be mapped to the multiplexed symbol including the PTRS, and the multiplexed symbol to which the UCI needs to be mapped needs to be closest to the multiplexed symbol to which the DMRS is mapped. Certainly, a mapping sequence for mapping the UCI and the PTRS is not limited in this embodiment of this application. A modulated symbol, in the multiplexed symbol, to which the PTRS needs to be mapped may be first determined, then the modulated symbol is reserved, and then the UCI is mapped to another modulated symbol in the multiplexed symbol. For example, the DMRS is mapped to the $3^{rd}$ multiplexed symbol, and the PTRS is mapped to the $1^{st}$, the $3^{rd}$, the $5^{th}$, the $7^{th}$, and the $9^{th}$ multiplexed symbols. If N=2, and the first multiplexed symbols are located on two sides of the second multiplexed symbol, because the DMRS is fully mapped to the $3^{rd}$ multiplexed symbol, the $1^{st}$ and the $5^{th}$ multiplexed symbols are closest to the $3^{rd}$ multiplexed symbol, and the UCI is mapped to the $1^{st}$ and the $5^{th}$ multiplexed symbols; or if the first multiplexed symbols are located on one side of the second multiplexed symbol, the UCI is mapped to the $5^{th}$ and the $7^{th}$ multiplexed symbols. It can be learned that the UCI is mapped to a multiplexed symbol to which the PTRS is mapped and that is closest to the multiplexed symbol to which the DMRS is mapped. This helps quickly demodulate the UCI, so as to improve UCI demodulation performance.

With reference to the second aspect or the first or the second possible implementation of the second aspect, in a third possible implementation, the method further includes: determining, by the network device, a modulation scheme for the uplink control information based on a modulation scheme for the transmitted data; and the obtaining, by the network device from the multiplexed symbols through demodulation, data, the uplink control information, and the demodulation reference signal that are transmitted by the terminal device includes: obtaining, by the network device, the transmitted data from the multiplexed symbols through demodulation based on the modulation scheme for the transmitted data, and obtaining, from the first multiplexed symbol through demodulation based on the modulation scheme for the uplink control information, the uplink control information sent by the terminal device. It can be learned from the third possible implementation of the second aspect that determining the modulation scheme for the uplink control information based on the modulation scheme for the to-be-transmitted data can maintain a low PAPR of the to-be-transmitted data and improve demodulation performance.

With reference to the third possible implementation of the second aspect, in a fourth possible implementation, the determining, by the network device, a modulation scheme for the uplink control information based on a modulation scheme for the transmitted data includes: if the multiplexed symbols are the DFT-s-OFDM symbols, when the transmitted data is modulated in a manner of π/2 binary phase shift keying BPSK, the modulation scheme for the uplink control information is the π/2 BPSK or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication. If the multiplexed symbols are the DFT-s-OFDM symbols, when the to-be-transmitted data is not modulated in the manner of the π/2 BPSK, the modulation scheme for the uplink control information may be the QPSK. The UCI may include the first-type information and second-type information. The first-type information may include an RI and a HARQ indication. The second-type information may include a CQI, a PMI, CSI, a CRI, and the like. The HARQ indication is HARQ information with a bit quantity less than a specific bit quantity, for example, the HARQ information includes 1 bit or 2 bits. The RI information is also RI information with a bit quantity less than a specific bit quantity, for example, the RI information includes 1 bit or 2 bits. The QAM includes 16QAM, 64QAM, 256QAM, and the like. The QPSK is a standard-preset QPSK constellation diagram, and may be different from an outermost constellation point of the QAM. A data modulation scheme may be further indicated by a modulation order, for example, modulation orders $Q_m$ 1, 2, 4, 6, and 8 respectively corresponding to the π/2-BPSK, the QPSK, the 16QAM, the 64QAM, and the 256QAM. It can be learned from the fourth possible implementation of the second aspect that a PAPR of the to-be-transmitted data does not increase when the modulation scheme for the uplink control information is the π/2 BPSK, and modulation robustness can be improved when the modulation scheme for the first-type information in the uplink control information is the quadrature phase shift keying QPSK.

According to a third aspect of this application, a signal transmission method is provided, including: obtaining, by a terminal device, to-be-transmitted data and uplink control information; determining, by the terminal device, a modulation scheme for the uplink control information based on a modulation scheme for the to-be-transmitted data; respectively modulating, by the terminal device, the to-be-transmitted data and the uplink control information based on the modulation scheme for the to-be-transmitted data and the modulation scheme for the uplink control information; and transmitting the modulated to-be-transmitted data and control information on a physical uplink shared channel. It can be learned from the third aspect that determining the modulation scheme for the uplink control information based on the modulation scheme for the to-be-transmitted data can maintain a low PAPR of the to-be-transmitted data and improve demodulation performance.

With reference to the third aspect, in a first possible implementation, the determining, by the terminal device, a modulation scheme for the UCI based on a modulation scheme for the to-be-transmitted data includes: if the multiplexed symbols are DFT-s-OFDM symbols, when the to-be-transmitted data is modulated in a manner of π/2 binary phase shift keying BPSK, the modulation scheme for the uplink control information is the π/2 BPSK; or if the multiplexed symbols are the OFDM symbols, when the to-be-transmitted data is modulated in a manner of quadrature amplitude modulation (QAM), a modulation scheme for first-type information in the uplink control information is quadrature phase shift keying QPSK, where the first-type information includes at least one of a rank indicator RI and a hybrid automatic repeat request HARQ indication. If the multiplexed symbols are the DFT-s-OFDM symbols, when the to-be-transmitted data is not modulated in the manner of the π/2 BPSK, the modulation scheme for the uplink control information may be the QPSK. The UCI may include the first-type information and second-type information. The first-type information may include an RI and a HARQ indication. The second-type information may include a CQI, a PMI, CSI, a CRI, and the like. The HARQ indication is HARQ information with a bit quantity less than a specific bit quantity, for example, the HARQ information includes 1 bit or 2 bits. The RI information is also RI information with a bit quantity less than a specific bit quantity, for example, the RI information includes 1 bit or 2 bits. The QAM includes 16QAM, 64QAM, 256QAM, and the like. The QPSK is a standard-preset QPSK constellation diagram, and may be different from an outermost constellation point of the QAM. A data modulation scheme may be further indicated by a modulation order, for example, modulation orders $Q_m$ 1, 2, 4, 6, and 8 respectively corresponding to the π/2-BPSK, the QPSK, the 16QAM, the 64QAM, and the 256QAM. It can be learned from the first possible implementation of the third aspect that a PAPR of the to-be-transmitted data does not increase when the modulation scheme for the uplink control information is the π/2 BPSK, and modulation robustness can be improved when the modulation scheme for the first-type information in the uplink control information is the quadrature phase shift keying QPSK.

According to a fourth aspect of this application, a signal transmission method is provided, including, receiving, by a network device, modulated transmitted data and uplink control information that are sent by a terminal device; determining, by the network device, a modulation scheme for the uplink control information based on a modulation scheme for the transmitted data; and demodulating, by the network device, the transmitted data based on the modulation scheme for the transmitted data, and demodulating the uplink control information based on the modulation scheme for the uplink control information. It can be learned from the fourth aspect that determining the modulation scheme for the uplink control information based on the modulation scheme for the to-be-transmitted data can maintain a low PAPR of the to-be-transmitted data and improve demodulation performance.

With reference to the fourth aspect, in a first possible implementation, the determining, by the network device, a modulation scheme for the uplink control information based on a modulation scheme for the transmitted data includes: if the multiplexed symbols are the DFT-s-OFDM symbols, when the transmitted data is modulated in a manner of π/2 binary phase shift keying BPSK, the modulation scheme for the uplink control information is the π/2 BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication. If the multiplexed symbols are the DFT-s-OFDM symbols, when the to-be-transmitted data is not modulated in the manner of the π/2 BPSK, the modulation scheme for the uplink control information may be the QPSK. The UCI may include the first-type information and second-type information. The first-type information may include an RI and a HARQ indication. The second-type information may include a CQI, a PMI, CSI, a CRI, and the like. The HARQ indication is HARQ information with a bit quantity less than a specific bit quantity, for example, the HARQ information includes 1 bit or 2 bits. The RI information is also RI information with a bit quantity less than a specific bit quantity, for example, the RI information includes 1 bit or 2 bits. The QAM includes 16QAM, 64QAM, 256QAM, and the like. The QPSK is a standard-preset QPSK constellation diagram, and may be different from an outermost constellation point of the QAM. A data modulation scheme may be further indicated by a modulation order, for example, modulation orders $Q_m$ 1, 2, 4, 6, and 8 respectively corresponding to the π/2-BPSK the QPSK, the 16QAM, the 64QAM, and the 256QAM. It can be learned from the first possible implementation of the fourth aspect that a PAPR of the to-be-transmitted data does not increase when the modulation scheme for the uplink control information is the π/2 BPSK, and modulation robustness can be improved when the modulation scheme for the first-type information in the uplink control information is the quadrature phase shift keying QPSK.

According to a fifth aspect of this application, a signal transmission method is provided, including: obtaining, by a terminal device, to-be-transmitted data and a demodulation reference signal, where a waveform used for the to-be-transmitted data and the demodulation reference signal is a discrete Fourier transform spread orthogonal frequency division multiplexing DFT-s-OFDM waveform, and a modulation scheme for the to-be-transmitted data is π/2 binary phase shift keying BPSK modulation; and transmitting, by the terminal device, the demodulation reference signal at first transmit power and transmitting the to-be-transmitted data at second transmit power on a physical uplink shared channel, where there is an offset between the first transmit power and the second transmit power. It can be learned from the fifth aspect that there is an offset between the first transmit power and the second transmit power. This can maintain a low PAPR of uplink data using the DFT-s-OFDM waveform.

With reference to the fifth aspect, in a first possible implementation, the first transmit power is less than the second transmit power. It can be learned from the first possible implementation of the fifth aspect that the first transmit power is less than the second transmit power. This can ensure that a PAPR of the demodulation reference signal does not cause an increase in a PAPR of the to-be-transmitted data, thereby improving system performance.

With reference to the first possible implementation of the fifth aspect, in a second possible implementation, the offset is less than a value X. X is a preset value, or is notified by a network device to the terminal device. It can be learned from the second possible implementation of the fifth aspect that a value of the first transmit power may be determined by limiting a range of the offset.

With reference to the fifth aspect or the first possible implementation of the fifth aspect, in a third possible implementation, the offset is a preset value, and different configuration information of the demodulation reference signal corresponds to different offsets. It can be learned from the third possible implementation of the fifth aspect that determining the offset based on the configuration information of the DMRS can improve transmission performance of the terminal device.

With reference to the fifth aspect or the first possible implementation of the fifth aspect, in a fourth possible implementation, the offset is a preset value, and different scheduled bandwidths correspond to different offsets. A transmission resource corresponding to the scheduled bandwidth is used to transmit the to-be-transmitted data and the demodulation reference signal. It can be learned from the fourth possible implementation of the fifth aspect that determining the offset based on the scheduled bandwidth can improve transmission performance of the terminal.

According to a sixth aspect of this application, a signal transmission method is provided, including: receiving, by a network device, modulated data and a modulated demodulation reference signal that are transmitted by a terminal device, where a waveform used for the transmitted data and the demodulation reference signal is a discrete Fourier transform spread orthogonal frequency division multiplexing DFT-s-OFDM waveform, and a modulation scheme for the transmitted data is π/2 binary phase shift keying BPSK modulation; and demodulating, by the network device, the transmitted data and the demodulation reference signal. It can be learned from the sixth aspect that there is an offset between first transmit power and second transmit power. This can maintain a low PAPR of uplink data using the DFT-s-OFDM waveform.

With reference to the sixth aspect, in a first possible implementation, the first transmit power is less than the second transmit power. It can be learned from the first possible implementation of the sixth aspect that the first transmit power is less than the second transmit power. This can ensure that a PAPR of the demodulation reference signal does not cause an increase in a PAPR of the to-be-transmitted data, thereby improving system performance.

With reference to the first possible implementation of the sixth aspect, in a second possible implementation, the offset is less than a value X. X is a preset value, or is notified by the network device to the terminal device. It can be learned from the second possible implementation of the sixth aspect that a value of the first power may be determined by limiting a range of the offset.

With reference to the sixth aspect or the first possible implementation of the sixth aspect, in a third possible implementation, the offset is a preset value, and different configuration information of the demodulation reference signal corresponds to different offsets. It can be learned from the third possible implementation of the sixth aspect that determining the offset based on the configuration information of the DMRS can improve transmission performance of the terminal.

With reference to the sixth aspect or the first possible implementation of the sixth aspect, in a fourth possible implementation, the offset is a preset value, and different scheduled bandwidths correspond to different offsets. A transmission resource corresponding to the scheduled bandwidth is used to transmit the to-be-transmitted data and the demodulation reference signal. It can be learned from the fourth possible implementation of the sixth aspect that determining the offset based on the scheduled bandwidth can improve transmission performance of the terminal.

According to a seventh aspect of this application, a signal transmission method is provided, including: obtaining, by a terminal device, to-be-transmitted data and a demodulation reference signal, where a waveform used for the to-be-transmitted data and the demodulation reference signal is a discrete Fourier transform spread orthogonal frequency division multiplexing DFT-s-OFDM waveform, and a modulation scheme for the to-be-transmitted data is π/2 binary phase shift keying BPSK modulation; performing, by the terminal device, frequency domain spectrum shaping FDSS processing on the to-be-transmitted data by using a first filter mode, and performing FDSS processing on the demodulation reference signal by using a second filter mode, where a roll-off degree of the first filter mode is higher than a roll-off degree of the second filter mode; and transmitting, by the terminal device on a physical uplink shared channel, the to-be-transmitted data and the demodulation reference signal obtained through FDSS processing. It can be learned from the seventh aspect that performing FDSS on the to-be-transmitted data and the DMRS by using different filter modes can reduce a PAPR of the DMRS, to prevent the PAPR of the DMRS from affecting a PAPR of the to-be-transmitted data.

With reference to the seventh aspect, in a first possible implementation, the performing, by the terminal device, frequency domain spectrum shaping FDSS processing on the to-be-transmitted data by using a first filter mode, and performing FDSS processing on the demodulation reference signal by using a second filter mode includes: determining, by the terminal device, a first filter parameter, where the first filter parameter is a filter parameter of the to-be-transmitted data determining, by the terminal device, a second filter parameter based on the first filter parameter, where the second filter parameter is a filter parameter of the demodulation reference signal, and a filter roll-off degree indicated by the second filter parameter is higher than a filter roll-off degree indicated by the first filter parameter; and filtering, by the terminal device, the to-be-transmitted data by using the first filter parameter, and filtering the demodulation reference signal by using the second filter parameter. The filter parameter may be a roll-off factor.

According to an eighth aspect of this application, a signal transmission method is provided, including: receiving, by a network device, data and a demodulation reference signal that are transmitted by a terminal device, where a waveform used for the transmitted data and the demodulation reference signal is a discrete Fourier transform spread orthogonal frequency division multiplexing DFT-s-OFDM waveform, a modulation scheme for the transmitted data is π/2 binary phase shift keying BPSK modulation, the terminal device has performed frequency domain spectrum shaping FDSS processing on the transmitted data by using a first filter mode, and the terminal device has performed frequency domain spectrum shaping FDSS processing on the demodulation reference signal by using a second filter mode; and demodulating, by the network device, the transmitted data and the demodulation reference signal. It can be learned from the eighth aspect that performing FDSS on the to-be-transmitted data and the DMRS by using different filter modes can reduce a PAPR of the DMRS, to prevent the PAPR of the DMRS from affecting a PAPR of the to-be-transmitted data.

According to a ninth aspect of this application, a terminal device is provided, including:
a processing module, configured to:
obtain to-be-transmitted data, uplink control information, and a demodulation reference signal; and
map the to-be-transmitted data, the uplink control information, and the demodulation reference signal to generate multiplexed symbols, where the multiplexed symbols include discrete Fourier transform spread orthogonal frequency division multiplexing DFT-s-OFDM symbols or orthogonal frequency division multiplexing OFDM symbols, N first multiplexed symbols are located on one side or two sides of a second multiplexed symbol, a location relationship between each of the N first multiplexed symbols and the second multiplexed symbol satisfies a mapping condition, N is an integer greater than or equal to 1, the first multiplexed symbol is a multiplexed symbol to which the uplink control information is mapped, and the second multiplexed symbol is a multiplexed symbol to which the demodulation reference signal is mapped; and
a transmission module, configured to transmit the multiplexed symbols on a physical uplink shared channel.

With reference to the ninth aspect, in a first possible implementation, that a location relationship between each of the N first multiplexed symbols and the second multiplexed symbol satisfies a mapping condition includes:
the N first multiplexed symbols are multiplexed symbols closest to the second multiplexed symbol.

With reference to the ninth aspect or the first possible implementation of the ninth aspect, in a second possible implementation, the processing module is further configured to:
obtain a phase tracking signal, where the phase tracking signal is further mapped to the multiplexed symbols; and
that a location relationship between each of the N first multiplexed symbols and the second multiplexed symbol satisfies a mapping condition includes:
the N first multiplexed symbols are multiplexed symbols to which the phase tracking signal is mapped and that are closest to the second multiplexed symbol.

With reference to the ninth aspect or the first or the second possible implementation of the ninth aspect, in a third possible implementation, the first multiplexed symbol includes a plurality of modulated symbols, the plurality of modulated symbols include uplink control information modulated symbols and data modulated symbols, and the data modulated symbols include a modulated symbol to which the to-be-transmitted data is mapped, or the data modulated symbols include a modulated symbol to which the to-be-transmitted data is mapped and a modulated symbol to which the phase tracking reference signal is mapped, and
when the multiplexed symbols are the OFDM symbols, the uplink control information modulated symbols are distributed in the plurality of modulated symbols at a uniform spacing.

With reference to the ninth aspect or the first, the second, or the third possible implementation of the ninth aspect, in a fourth possible implementation,
the processing module is further configured to:
determine a modulation scheme for the uplink control information based on a modulation scheme for the to-be-transmitted data; and
respectively modulate the to-be-transmitted data and the uplink control information based on the modulation scheme for the to-be-transmitted data and the modulation scheme for the uplink control information.

With reference to the fourth possible implementation of the ninth aspect, in a fifth possible implementation,
if the multiplexed symbols are the DFT-s-OFDM symbols, when the to-be-transmitted data is modulated in a manner of π/2 binary phase shift keying BPSK, the modulation scheme for the uplink control information is the π/2 BPSK; or
if the multiplexed symbols are the OFDM symbols, when the to-be-transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

According to a tenth aspect of this application, a network device is provided, including:
a receiving module, configured to receive multiplexed symbols sent by a terminal device, where the multiplexed symbols include discrete Fourier transform spread orthogonal frequency division multiplexing DFT-s-OFDM symbols or orthogonal frequency division multiplexing OFDM symbols, N first multiplexed symbols are located on one side or two sides of a second multiplexed symbol, a location relationship between each of the N first multiplexed symbols and the second multiplexed symbol satisfies a mapping condition, N is an integer greater than or equal to 1, the first multiplexed symbol is a multiplexed symbol to which uplink control information is mapped, and the second multiplexed symbol is a multiplexed symbol to which a demodulation reference signal is mapped; and a processing module, configured to obtain, through demodulation and from the multiplexed symbols received by the receiving module, data, the uplink control information, and the demodulation reference signal that are transmitted by the terminal device.

With reference to the tenth aspect, in a first possible implementation, that a location relationship between each of the N first multiplexed symbols and the second multiplexed symbol satisfies a mapping condition includes:

the N first multiplexed symbols are multiplexed symbols closest to the second multiplexed symbol.

With reference to the tenth aspect or the first possible implementation of the tenth aspect, in a second possible implementation, that a location relationship between each of the N first multiplexed symbols and the second multiplexed symbol satisfies a mapping condition includes:

the N first multiplexed symbols are multiplexed symbols to which a phase tracking signal is mapped and that are closest to the second multiplexed symbol; and the processing module is further configured to:

obtain the phase tracking signal from the multiplexed symbols through demodulation.

With reference to the tenth aspect or the first or the second possible implementation of the tenth aspect, in a third possible implementation, the network device further includes: the processing module is further configured to:

determine a modulation scheme for the uplink control information based on a modulation scheme for the transmitted data; and obtain the transmitted data from the multiplexed symbols through demodulation based on the modulation scheme for the transmitted data, and obtain, from the first multiplexed symbol through demodulation based on the modulation scheme for the uplink control information, the uplink control information sent by the terminal device.

With reference to the third possible implementation of the tenth aspect, in a fourth possible implementation, if the multiplexed symbols are the DFT-s-OFDM symbols, when the transmitted data is modulated in a manner of $\pi/2$ binary phase shift keying BPSK, the modulation scheme for the uplink control information is the $\pi/2$ BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

According to an eleventh aspect of this application, a terminal device is provided, including:

a processing module, configured to:

obtain to-be-transmitted data and uplink control information;

determine a modulation scheme for the uplink control information based on a modulation scheme for the obtained to-be-transmitted data; and respectively modulate the to-be-transmitted data and the uplink control information based on the modulation scheme for the to-be-transmitted data and the determined modulation scheme for the uplink control information; and a transmission module, configured to transmit, on a physical uplink shared channel, the to-be-transmitted data and the control information modulated by a modulation module.

With reference to the eleventh aspect, in a first possible implementation, if the multiplexed symbols are the DFT-s-OFDM symbols, when the to-be-transmitted data is modulated in a manner of $\pi/2$ binary phase shift keying BPSK, the modulation scheme for the uplink control information is the $\pi/2$ BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

According to a twelfth aspect of this application, a network device is provided, including:

a receiving module, configured to receive modulated transmitted data and uplink control information that are sent by a terminal device; and a processing module, configured to:

determine a modulation scheme for the uplink control information based on a modulation scheme for the transmitted data received by the receiving module; and demodulate the transmitted data based on the modulation scheme for the transmitted data, and demodulate the uplink control information based on the determined modulation scheme for the uplink control information.

With reference to the twelfth aspect, in a first possible implementation, if the multiplexed symbols are the DFT-s-OFDM symbols, when the transmitted data is modulated in a manner of $\pi/2$ binary phase shift keying BPSK, the modulation scheme for the uplink control information is the $\pi/2$ BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

According to a thirteenth aspect of this application, a terminal device is provided, including:

a processing module, configured to:

obtain to-be-transmitted data and a demodulation reference signal, where a waveform used for the to-be-transmitted data and the demodulation reference signal is a discrete Fourier transform spread orthogonal frequency division multiplexing DFT-s-OFDM waveform, and a modulation scheme for the to-be-transmitted data is $\pi/2$ binary phase shift keying BPSK modulation; and a transmission module, configured to transmit the obtained demodulation reference signal at first transmit power and transmit the to-be-transmitted data at second transmit power on a physical uplink shared channel, where there is an offset between the first transmit power and the second transmit power.

According to a fourteenth aspect of this application, a network device is provided, including:
a receiving module, configured to receive modulated data and a modulated demodulation reference signal that are transmitted by a terminal device, where a waveform used for the transmitted data and the demodulation reference signal is a discrete Fourier transform spread orthogonal frequency division multiplexing DFT-s-OFDM waveform, and a modulation scheme for the transmitted data is π/2 binary phase shift keying BPSK modulation; and
a processing module, configured to demodulate the transmitted data and the demodulation reference signal that are received by the receiving module.

According to a fifteenth aspect of this application, a terminal device is provided, including:
a processing module, configured to:
obtain to-be-transmitted data and a demodulation reference signal, where a waveform used for the to-be-transmitted data and the demodulation reference signal is a discrete Fourier transform spread orthogonal frequency division multiplexing DFT-s-OFDM waveform, and a modulation scheme for the to-be-transmitted data is π/2 binary phase shift keying BPSK modulation; and
perform frequency domain spectrum shaping FDSS processing on the obtained to-be-transmitted data by using a first filter mode, and perform FDSS processing on the demodulation reference signal by using a second filter mode, where a roll-off degree of the first filter mode is higher than a roll-off degree of the second filter mode, and
a transmission module, configured to transmit, on a physical uplink shared channel, the to-be-transmitted data and the demodulation reference signal obtained by the processing module by performing FDSS processing.

With reference to the fifteenth aspect, in a first possible implementation,
the processing module is specifically configured to:
determine a first filter parameter, where the first filter parameter is a filter parameter of the to-be-transmitted data;
determine a second filter parameter based on the first filter parameter, where the second filter parameter is a filter parameter of the demodulation reference signal, and a filter roll-off degree indicated by the second filter parameter is higher than a filter roll-off degree indicated by the first filter parameter; and
filter the to-be-transmitted data by using the first filter parameter, and filter the demodulation reference signal by using the second filter parameter.

According to a sixteenth aspect of this application, a network device is provided, including:
a receiving module, configured to receive data and a demodulation reference signal that are transmitted by a terminal device, where a waveform used for the transmitted data and the demodulation reference signal is a discrete Fourier transform spread orthogonal frequency division multiplexing DFT-s-OFDM waveform, a modulation scheme for the transmitted data is π/2 binary phase shift keying BPSK modulation, the terminal device has performed frequency domain spectrum shaping FDSS processing on the transmitted data by using a first filter mode, and the terminal device has performed frequency domain spectrum shaping FDSS processing on the demodulation reference signal by using a second filter mode; and
a processing module, configured to demodulate the transmitted data and the demodulation reference signal.

According to a seventeenth aspect of this application, a terminal device is provided, including a memory, a transceiver, and at least one processor. The memory stores an instruction. The memory, the transceiver, and the at least one processor are interconnected by using a line. The transceiver is configured to perform a signal sending/receiving operation that is performed on the terminal device side in any one of the first aspect or the possible implementations of the first aspect. The signal sending/receiving operation herein may be the transmitting the multiplexed symbols on a physical uplink shared channel in the first aspect.

The at least one processor invokes the instruction, and performs a signal processing or control operation that is performed on the terminal device side in any one of the first aspect or the possible implementations of the first aspect.

The signal processing or control operation herein may be the obtaining to-be-transmitted data, uplink control information, and a demodulation reference signal, and mapping the to-be-transmitted data, the uplink control information, and the demodulation reference signal to generate multiplexed symbols in the first aspect; or may be the obtaining a phase tracking signal in the second possible implementation of the first aspect; or may be the determining a modulation scheme for the uplink control information based on a modulation scheme for the to-be-transmitted data, and respectively modulating the to-be-transmitted data and the uplink control information based on the modulation scheme for the to-be-transmitted data and the modulation scheme for the uplink control information in the fourth possible implementation of the first aspect.

According to an eighteenth aspect of this application, a network device is provided, including a memory, a transceiver, and at least one processor. The memory stores an instruction. The memory, the transceiver, and the at least one processor are interconnected by using a line. The transceiver is configured to perform a signal sending/receiving operation that is performed on the network device side in any one of the second aspect or the possible implementations of the second aspect. The signal sending/receiving operation herein may be the receiving multiplexed symbols sent by a terminal device in the second aspect.

The at least one processor invokes the instruction, and performs a signal processing or control operation that is performed on the network device side in any one of the second aspect or the possible implementations of the second aspect. The signal processing or control operation herein may be the obtaining, from the multiplexed symbols through demodulation, data, the uplink control information, and the demodulation reference signal that are transmitted by the terminal device in the second aspect; or may be the obtaining the phase tracking signal from the multiplexed symbols through demodulation in the second possible implementation of the second aspect; or may be the determining a modulation scheme for the uplink control information based on a modulation scheme for the transmitted data, and obtaining the transmitted data from the multiplexed symbols through demodulation based on the modulation scheme for the transmitted data, and obtaining, from the first multiplexed symbol through demodulation based on the modulation scheme for the uplink control information, the uplink control information sent by the terminal device in the third possible implementation of the second aspect.

According to a nineteenth aspect of this application, a terminal device is provided, including a memory, a transceiver, and at least one processor. The memory stores an instruction. The memory, the transceiver, and the at least one processor are interconnected by using a line. The transceiver is configured to perform a signal sending/receiving operation that is performed on the terminal device side in any one of the third aspect or the possible implementations of the third aspect. The signal sending/receiving operation herein may be the transmitting the modulated to-be-transmitted data and control information on a physical uplink shared channel in the third aspect.

The at least one processor invokes the instruction, and performs a signal processing or control operation that is performed on the terminal device side in any one of the third aspect or the possible implementations of the third aspect. The signal processing or control operation herein may be the obtaining to-be-transmitted data and uplink control information, determining a modulation scheme for the uplink control information based on a modulation scheme for the to-be-transmitted data, and respectively modulating the to-be-transmitted data and the uplink control information based on the modulation scheme for the to-be-transmitted data and the modulation scheme for the uplink control information in the third aspect.

According to a twentieth aspect of this application, a network device is provided, including a memory, a transceiver, and at least one processor. The memory stores an instruction. The memory, the transceiver, and the at least one processor are interconnected by using a line. The transceiver is configured to perform a signal sending/receiving operation that is performed on the network device side in any one of the fourth aspect or the possible implementations of the fourth aspect. The signal sending/receiving operation herein may be the receiving modulated transmitted data and uplink control information that are sent by a terminal device in the fourth aspect.

The at least one processor invokes the instruction, and performs a signal processing or control operation that is performed on the network device side in any one of the fourth aspect or the possible implementations of the fourth aspect. The signal processing or control operation herein may be the determining a modulation scheme for the uplink control information based on a modulation scheme for the transmitted data, demodulating the transmitted data based on the modulation scheme for the transmitted data, and demodulating the uplink control information based on the modulation scheme for the uplink control information.

According to a twenty-first aspect of this application, a terminal device is provided, including a memory, a transceiver, and at least one processor. The memory stores an instruction. The memory, the transceiver, and the at least one processor are interconnected by using a line. The transceiver is configured to perform a signal sending/receiving operation that is performed on the terminal device side in any one of the fifth aspect or the possible implementations of the fifth aspect. The signal sending/receiving operation herein may be the transmitting the demodulation reference signal at first transmit power and transmitting the to-be-transmitted data at second transmit power on a physical uplink shared channel in the fifth aspect.

The at least one processor invokes the instruction, and performs a signal processing or control operation that is performed on the terminal device side in any one of the fifth aspect or the possible implementations of the fifth aspect. The signal processing or control operation herein may be the obtaining to-be-transmitted data and a demodulation reference signal in the fifth aspect.

According to a twenty-second aspect of this application, a network device is provided, including a memory, a transceiver, and at least one processor. The memory stores an instruction. The memory, the transceiver, and the at least one processor are interconnected by using a line. The transceiver is configured to perform a signal sending/receiving operation that is performed on the network device side in any one of the sixth aspect or the possible implementations of the sixth aspect. The signal sending/receiving operation herein may be the receiving modulated data and a modulated demodulation reference signal that are transmitted by a terminal device in the sixth aspect.

The at least one processor invokes the instruction, and performs a signal processing or control operation that is performed on the network device side in any one of the sixth aspect or the possible implementations of the sixth aspect. The signal processing or control operation herein may be the demodulating the transmitted data and the demodulation reference signal in the sixth aspect.

According to a twenty-third aspect of this application, a terminal device is provided, including a memory, a transceiver, and at least one processor. The memory stores an instruction. The memory, the transceiver, and the at least one processor are interconnected by using a line. The transceiver is configured to perform a signal sending/receiving operation that is performed on the terminal device side in any one of the seventh aspect or the possible implementations of the seventh aspect. The signal sending/receiving operation herein may be the transmitting, on a physical uplink shared channel, the to-be-transmitted data and the demodulation reference signal obtained through FDSS processing in the seventh aspect.

The at least one processor invokes the instruction, and performs a signal processing or control operation that is performed on the terminal device side in any one of the seventh aspect or the possible implementations of the seventh aspect. The signal processing or control operation herein may be the obtaining to-be-transmitted data and a demodulation reference signal, performing frequency domain spectrum shaping FDSS processing on the to-be-transmitted data by using a first filter mode, and performing FDSS processing on the demodulation reference signal by using a second filter mode in the seventh aspect; or may be the determining a first filter parameter, determining a second filter parameter based on the first filter parameter, filtering the to-be-transmitted data by using the first filter parameter, and filtering the demodulation reference signal by using the second filter parameter in the first possible implementation of the seventh aspect.

According to a twenty-fourth aspect of this application, a network device is provided, including a memory, a transceiver, and at least one processor. The memory stores an instruction. The memory, the transceiver, and the at least one processor are interconnected by using a line. The transceiver is configured to perform a signal sending/receiving operation that is performed on the network device side in any one of the eighth aspect or the possible implementations of the eighth aspect. The signal sending/receiving operation herein may be the receiving data and a demodulation reference signal that are transmitted by a terminal device in the eighth aspect.

The at least one processor invokes the instruction, and performs a signal processing or control operation that is performed on the network device side in any one of the eighth aspect or the possible implementations of the eighth aspect. The signal processing or control operation herein may be the demodulating the transmitted data and the demodulation reference signal in the eighth aspect.

According to a twenty-fifth aspect of this application, a chip system is provided, and is applied to a terminal device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the terminal device in any one of the first aspect or the possible implementations of the first aspect.

According to a twenty-sixth aspect of this application, a chip system is provided, and is applied to a network device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the network device in any one of the second aspect or the possible implementations of the second aspect.

According to a twenty-seventh aspect of this application, a chip system is provided, and is applied to a terminal device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the terminal device in any one of the third aspect or the possible implementations of the third aspect.

According to a twenty-eighth aspect of this application, a chip system is provided, and is applied to a network device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the network device in any one of the fourth aspect or the possible implementations of the fourth aspect.

According to a twenty-ninth aspect of this application, a chip system is provided, and is applied to a terminal device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the terminal device in any one of the fifth aspect or the possible implementations of the fifth aspect.

According to a thirtieth aspect of this application, a chip system is provided, and is applied to a network device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the network device in any one of the sixth aspect or the possible implementations of the sixth aspect.

According to a thirty-first aspect of this application, a chip system is provided, and is applied to a terminal device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the terminal device in any one of the seventh aspect or the possible implementations of the seventh aspect.

According to a thirty-second aspect of this application, a chip system is provided, and is applied to a network device. The chip system includes at least one processor and a communications interface. The chip system may further include a memory. The memory, the communications interface, and the at least one processor are interconnected by using a line. The at least one memory stores an instruction. The instruction is executed by the processor to perform the operations of the network device in any one of the eighth aspect or the possible implementations of the eighth aspect.

According to another aspect of this application, a computer readable storage medium is provided, and is applied to a terminal device. The computer readable storage medium stores an instruction. When the instruction is run on a computer, the computer is enabled to perform the method in any one of the first aspect or the possible implementations of the first aspect.

According to still another aspect of this application, a computer readable storage medium is provided, and is applied to a network device. The computer readable storage medium stores an instruction. When the instruction is run on a computer, the computer is enabled to perform the method in any one of the second aspect or the possible implementations of the second aspect.

According to still another aspect of this application, a computer readable storage medium is provided, and is applied to a terminal device. The computer readable storage medium stores an instruction. When the instruction is run on a computer, the computer is enabled to perform the method in any one of the third aspect or the possible implementations of the third aspect.

According to still another aspect of this application, a computer readable storage medium is provided, and is applied to a network device. The computer readable storage medium stores an instruction. When the instruction is run on a computer, the computer is enabled to perform the method in any one of the fourth aspect or the possible implementations of the fourth aspect.

According to still another aspect of this application, a computer readable storage medium is provided, and is applied to a terminal device. The computer readable storage medium stores an instruction. When the instruction is run on a computer, the computer is enabled to perform the method in any one of the fifth aspect or the possible implementations of the fifth aspect.

According to still another aspect of this application, a computer readable storage medium is provided, and is applied to a network device. The computer readable storage medium stores an instruction. When the instruction is run on a computer, the computer is enabled to perform the method in any one of the sixth aspect or the possible implementations of the sixth aspect.

According to still another aspect of this application, a computer readable storage medium is provided, and is applied to a terminal device. The computer readable storage medium stores an instruction. When the instruction is run on a computer, the computer is enabled to perform the method in any one of the seventh aspect or the possible implementations of the seventh aspect.

According to still another aspect of this application, a computer readable storage medium is provided, and is applied to a network device. The computer readable storage medium stores an instruction. When the instruction is run on a computer, the computer is enabled to perform the method in any one of the eighth aspect or the possible implementations of the eighth aspect.

According to still another aspect of this application, a computer program product including an instruction is provided, and is applied to a terminal device. When the program is run on a computing device, the operations of the terminal device in any one of the first aspect or the possible implementations of the first aspect are performed.

According to still another aspect of this application, a computer program product including an instruction is provided, and is applied to a network device. When the program is run on a computing device, the operations of the network device in any one of the second aspect or the optional implementations of the second aspect are performed.

According to still another aspect of this application, a computer program product including an instruction is provided, and is applied to a terminal device. When the program is run on a computing device, the operations of the terminal device in any one of the third aspect or the optional implementations of the third aspect are performed.

According to still another aspect of this application, a computer program product including an instruction is provided, and is applied to a network device. When the program is run on a computing device, the operations of the network device in any one of the fourth aspect or the optional implementations of the fourth aspect are performed.

According to still another aspect of this application, a computer program product including an instruction is provided, and is applied to a terminal device. When the program is run on a computing device, the operations of the terminal device in any one of the fifth aspect or the optional implementations of the fifth aspect are performed.

According to still another aspect of this application, a computer program product including an instruction is provided, and is applied to a network device. When the program is run on a computing device, the operations of the network device in any one of the sixth aspect or the optional implementations of the sixth aspect are performed.

According to still another aspect of this application, a computer program product including an instruction is provided, and is applied to a terminal device. When the program is run on a computing device, the operations of the terminal device in any one of the seventh aspect or the optional implementations of the seventh aspect are performed.

According to still another aspect of this application, a computer program product including an instruction is provided, and is applied to a network device. When the program is run on a computing device, the operations of the network device in any one of the eighth aspect or the optional implementations of the eighth aspect are performed.

According to still another aspect of this application, a signal transmission system is provided, including a terminal device and a network device, where the terminal device is the terminal device in any one of the ninth aspect or the possible implementations of the ninth aspect; and the network device is the network device in any one of the tenth aspect or the possible implementations of the tenth aspect.

According to still another aspect of this application, a signal transmission system is provided, including a terminal device and a network device, where the terminal device is the terminal device in any one of the eleventh aspect or the possible implementations of the eleventh aspect; and the network device is the network device in any one of the twelfth aspect or the possible implementations of the twelfth aspect.

According to still another aspect of this application, a signal transmission system is provided, including a terminal device and a network device, where the terminal device is the terminal device in any one of the thirteenth aspect or the possible implementations of the thirteenth aspect; and the network device is the network device in any one of the fourteenth aspect or the possible implementations of the fourteenth aspect.

According to still another aspect of this application, a signal transmission system is provided, including a terminal device and a network device, where the terminal device is the terminal device in any one of the fifteenth aspect or the possible implementations of the fifteenth aspect; and the network device is the network device in any one of the sixteenth aspect or the possible implementations of the sixteenth aspect.

According to the signal transmission method provided in the embodiments of this application, it can be ensured that a PAPR of uplink data does not increase when the uplink data is transmitted on a physical uplink shared signal together with a demodulation reference signal, and demodulation performance can be improved when uplink data is transmitted on a physical uplink shared signal together with uplink control information.

DESCRIPTION OF EMBODIMENTS

Figure 1:
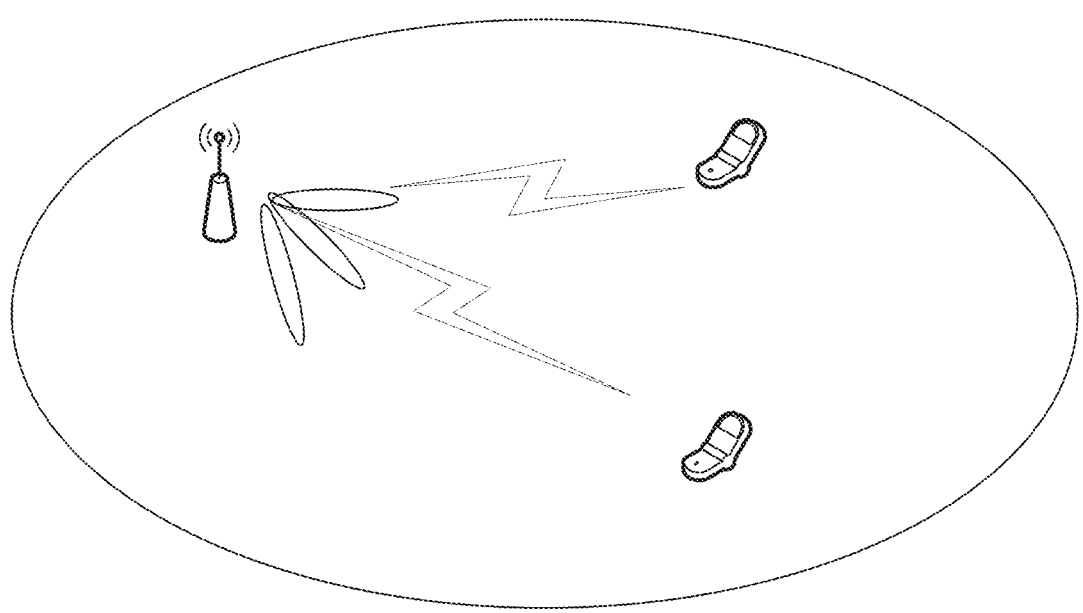
FIG. 1 is a schematic diagram of an embodiment of a signal transmission system.

The following describes the embodiments of this application with reference to the accompanying drawings. Apparently, the described embodiments are merely some but not all of the embodiments of this application. A person of ordinary skill in the art may know that, with development of technologies and emergence of new scenarios, the technical solutions provided in the embodiments of this application are also applicable to similar technical problems.

The embodiments of this application provide a signal transmission method, to ensure that a PAPR of uplink data does not increase when the uplink data is transmitted on a physical uplink shared signal together with a demodulation reference signal, and improve demodulation performance when uplink data is transmitted on a physical uplink shared signal together with uplink control information. The embodiments of this application further provide a corresponding device and system and a computer readable storage medium. The following separately provides detailed descriptions.

Terms "uplink" and "downlink" in this application are used to describe transmission directions of data/information in some scenarios. For example, an "uplink" direction is a direction in which the data/information is transmitted from a terminal device to a network side, and a "downlink" direction is a direction in which the data/information is transmitted from a network-side device to the terminal device. The "uplink" and "downlink" are merely used to describe the directions, and specific transmission start and termination devices of the data/information are not limited.

A term "and/or" in this application describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms "first", "second", and so on are intended to distinguish between similar objects but do not necessarily indicate a specific order or sequence. It should be understood that the data used in such a way is interchangeable in proper circumstances so that the embodiments described herein can be implemented in orders other than the order illustrated or described herein. Moreover, the terms "including", "having", and any other variants thereof mean to cover the non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in this application do not mean that the steps in a method procedure need to be performed in a time/logical sequence indicated by the names or the numbers. An execution sequence of named or numbered procedure steps may be changed based on a to-be-implemented technical objective, provided that a same or similar technical effect can be achieved. Module division in this application is merely logical division, and there may be other division manners in actual application. For example, a plurality of modules may be combined or integrated into another system, or some features may be ignored or not performed. In addition, the shown or discussed mutual couplings or direct couplings or communication connections may be implemented through some interfaces. The indirect couplings or communication connections between the modules may be implemented in electrical or other similar forms. This is not limited in this application. In addition, modules or submodules described as separate components may be or may not be physically separated, or may be or may not be physical modules, or may be distributed in a plurality of circuit modules. Objectives of the solutions of this application may be achieved by selecting some or all of the modules based on actual requirements.

FIG. 1 is a schematic diagram of an embodiment of a signal transmission system according to the embodiments of this application.

As shown in FIG. 1, the signal transmission system includes a network device and a terminal device.

In this embodiment of this application, the network device is an apparatus that is deployed on a radio access network and that provides a wireless communication function for the terminal device. The network device may include various forms of base stations such as a macro base station, a micro base station (also referred to as a small cell), a relay station, and an access point. In systems that use different radio access technologies, names of a device that has a base station function may be different. For example, in an LTE system, the device is referred to as an evolved NodeB (eNB or eNodeB), and in a 3rd generation (3G for short) system, the device is referred to as a NodeB. For ease of description, in all the embodiments of this application, all the foregoing apparatuses that provide a wireless communication function for a terminal are referred to as network devices or base stations or BSs.

The terminal device in this embodiment of this application may include various handheld devices, vehicle-mounted devices, wearable devices, or computing devices that have a wireless communication function, or other processing devices connected to a wireless modem. The terminal device may be an MS (English: Mobile Station), a subscriber unit, a cellular phone, a smartphone, a wireless data card, a personal digital assistant (PDA for short) computer, a tablet computer, a wireless modem, a handset, a laptop computer, a machine type communication (MTC for short) terminal, or the like.

Figure 2:
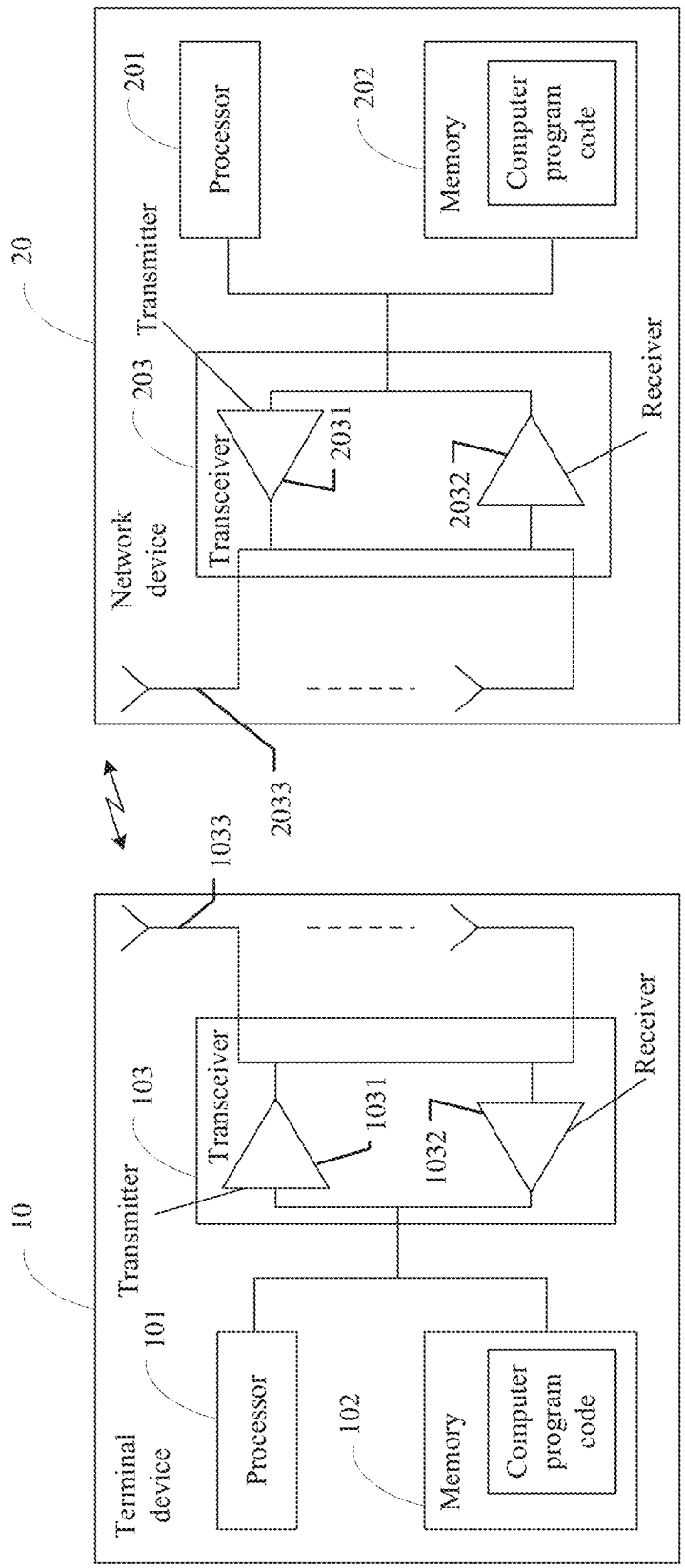
FIG. 2 is a schematic diagram of another embodiment of a signal transmission system according to the embodiments of this application.

The signal transmission system shown in FIG. 1 may alternatively be represented in another form. As shown in FIG. 2, a signal transmission system includes a terminal device 10 and a network device 20. The terminal device 10 includes a processor 101, a memory 102, and a transceiver 103. The transceiver 103 includes a transmitter 1031, a receiver 1032, and an antenna 1033. The network device 20 includes a processor 201, a memory 202, and a transceiver 203. The transceiver 203 includes a transmitter 2031, a receiver 2032, and an antenna 2033.

A signal transmission process in the embodiments of this application is mainly performed by the transmitter 1031 of the terminal device 10 and the receiver 2032 of the network device 20. Therefore, a process in which at least one of signals such as a DMRS, UCI, and a PTRS is transmitted on a PUSCH together with uplink data is described with reference to a signal transmission process of the terminal device 10 shown in FIG. 3.

Figure 3:
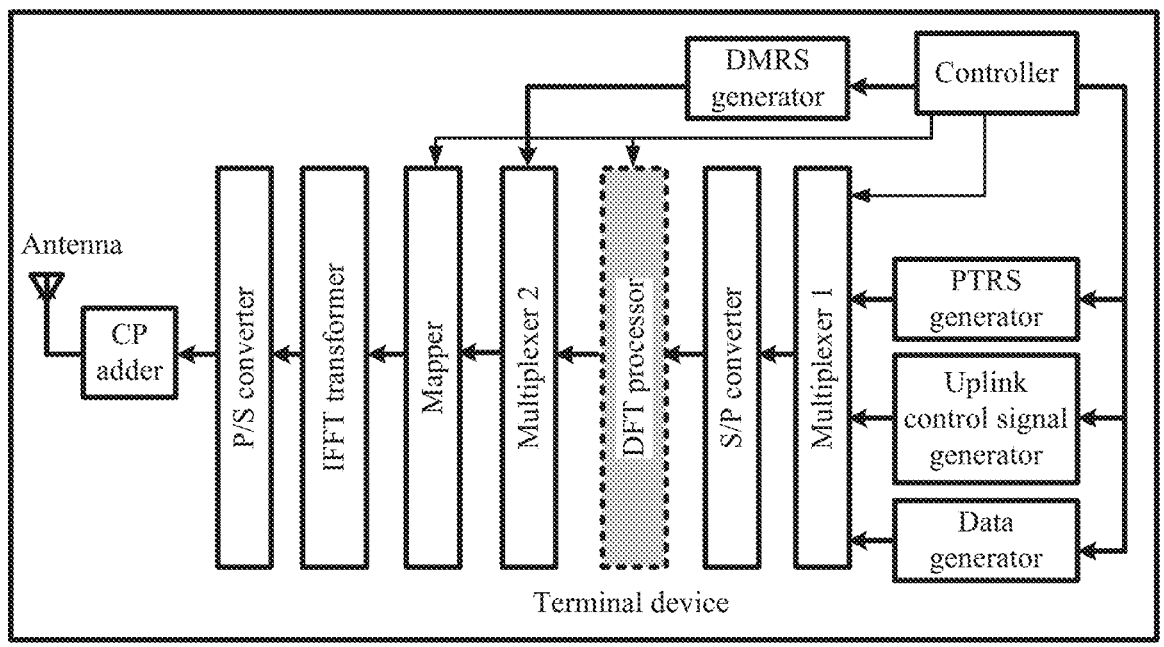
FIG. 3 is a schematic structural diagram of a terminal device according to an embodiment of this application.

The terminal device shown in FIG. 3 includes a controller, a DMRS generator, a PTRS generator, an uplink control signal (UCI) generator, a data generator, a multiplexer (Multiplexer, MUX) 1, a serial-to-parallel (S/P) converter, a discrete Fourier transform (DFT) processor, a multiplexer 2, a mapper, an inverse fast Fourier transform (IFFT) processor, a parallel-to-serial (P/S) converter, a cyclic prefix (CP) adder, and an antenna. The controller, the DMRS generator, the PTRS generator, the uplink control signal (UCI) generator, the data generator, the multiplexer 1, the S/P converter, the DFT processor, the multiplexer 2, the mapper, the IFFT processor, the P/S converter, and the CP adder may be implemented by software, or may be implemented by a circuit in a corresponding chip, or may be implemented in a processor.

The controller provides overall control on data and signal transmission operations of the terminal device, and generates control signals required for the multiplexer 1, the DFT processor, the mapper, the DMRS generator, the PTRS generator, the uplink control signal generator, and the data generator. Control signals provided for the DMRS generator and the PTRS generator indicate a sequence index and a mapping pattern that are used to generate a pilot sequence. Control signals associated with uplink control information transmission and data transmission are provided for the uplink control signal generator and the data generator.

The multiplexer 1 multiplexes, based on information indicated by control signals received from the controller, a PTRS signal, a data signal, and a control signal that are received from the PTRS generator, the data generator, and the control channel signal generator.

The S/P converter converts a signal coming from the multiplexer 1 into a parallel signal, and provides the parallel signal for the DFT processor or the multiplexer 2. The DFT processor is optional, and is used only when a DFT-s-OFDM waveform is configured for the terminal device.

The multiplexer 2 multiplexes a signal coming from the DFT processor (for a DFT-s-OFDM waveform) or the S/P converter (for an OFDM waveform) with a DMRS signal generated by the DMRS generator.

The mapper maps a signal obtained by the multiplexer 2 to a frequency resource. The IFFT processor converts a frequency signal obtained through mapping into a time signal, and the P/S converter serializes the time signal.

The CP adder adds a CP to the time signal output by the P/S converter, and transmits a signal carrying the CP through the transmit antenna.

Figure 4A:
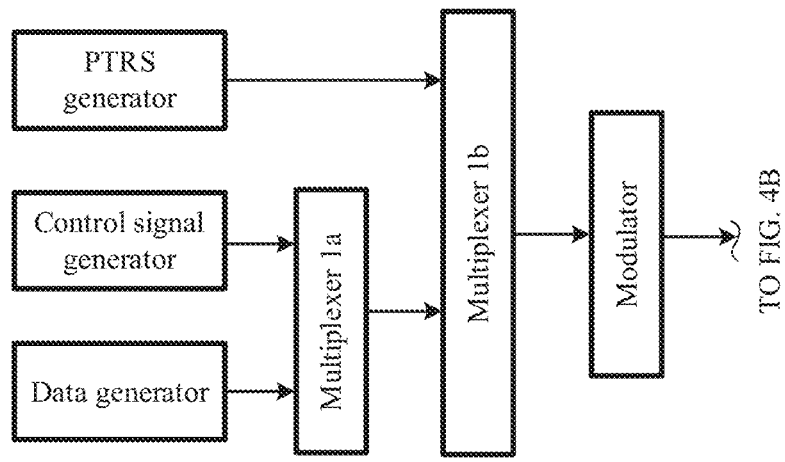
FIG. 4A, FIG. 4B, and FIG. 4C are a schematic diagram of a possible internal structure of a multiplexer 1 in FIG. 3.
Figure 4B:
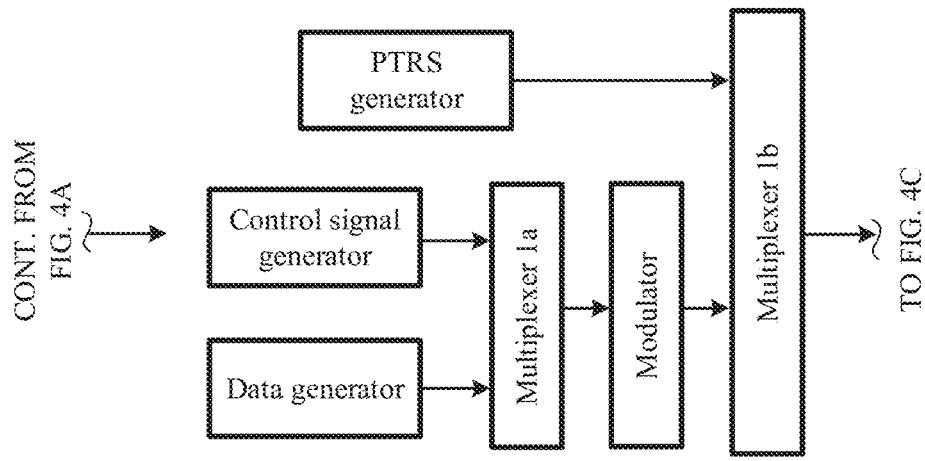
Figure 4C:
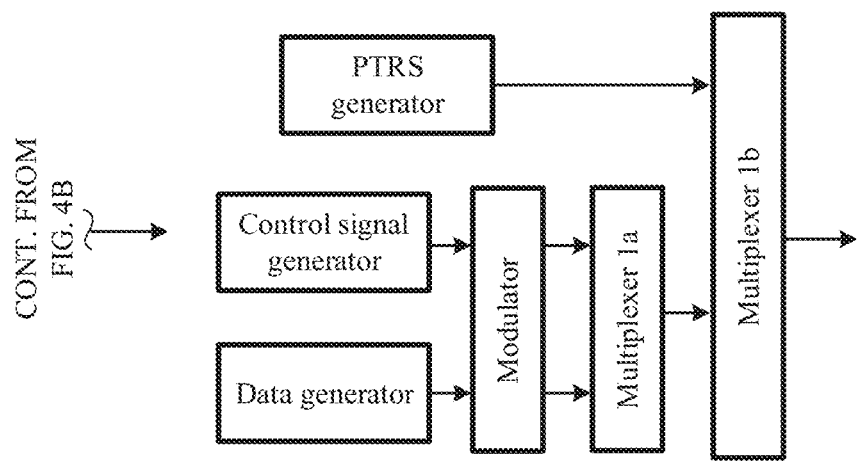

The multiplexer 1 shown in FIG. 3 may have three internal structures included in (a), (b), and (c) in FIG. 4A, FIG. 4B, and FIG. 4C. Both a data generator and a control signal generator in FIG. 4A, FIG. 4B, and FIG. 4C generate bit streams. The structure shown in (a) in FIG. 4A indicates that to-be-transmitted data and UCI are multiplexed by a multiplexer 1a to obtain a bit stream, then the bit stream and a PTRS are multiplexed by a multiplexer 1b to obtain a bit stream, and then a modulator performs symbol mapping on the bit stream. The structure shown in (b) in FIG. 4B indicates that to-be-transmitted data and UCI are multiplexed by a multiplexer 1a to obtain a bit stream, then a modulator performs symbol mapping on the bit stream to obtain a modulated symbol, and then the modulated symbol and a PTRS are multiplexed by a multiplexer 1b. The structure shown in (c) in FIG. 4C indicates that a modulator first performs symbol mapping on to-be-transmitted data and UCI to obtain a modulated symbol, then the modulated symbol is multiplexed by a multiplexer 1a to obtain a bit stream, and then the bit stream and a PTRS are multiplexed by a multiplexer 1b.

Figure 5:
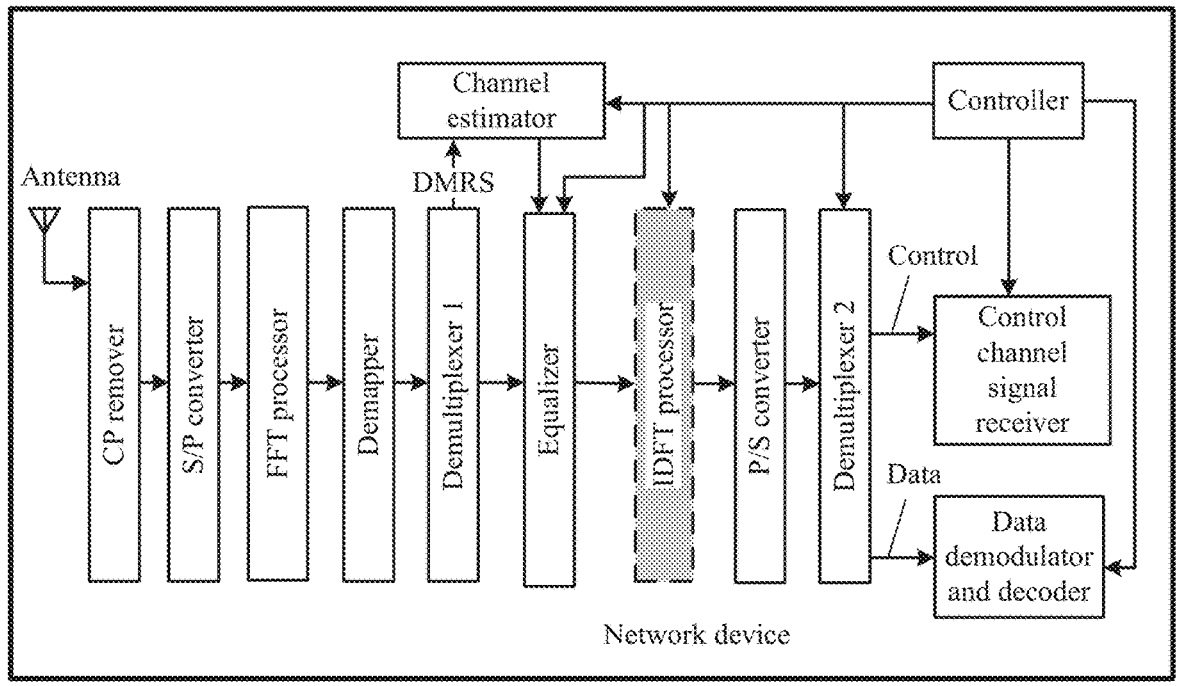
FIG. 5 is a schematic structural diagram of a network device according to an embodiment of this application.

A signal receiving and processing procedure on a network device side may be understood with reference to FIG. 5. As shown in FIG. 5, a network device includes an antenna, a cyclic prefix (CP) remover, a serial-to-parallel (S/P) converter, a fast Fourier transform (FFT) processor, a demapper, a demultiplexer 1, an equalizer, an inverse discrete Fourier transform (IDFT) processor, a parallel-to-serial (P/S) converter, a demultiplexer 2, a controller, a control channel signal receiver, a channel estimator, and a data demodulator and decoder. The CP remover, the S/P converter, the FFT processor, the demapper, the demultiplexer 1, the equalizer, the IDFT processor, the P/S converter, the demultiplexer 2, the controller, the control channel signal receiver, the channel estimator, and the data demodulator and decoder may be implemented by software, or may be implemented by a circuit in a corresponding chip, or may be implemented in a processor.

The controller provides overall control, and also generates control signals required for the demultiplexer 2, the IDFT processor, the equalizer, the control channel signal receiver, the channel estimator, and the data demodulator and decoder. Control signals related to uplink control information and data are provided for the control channel signal receiver and the data demodulator and decoder. A control channel signal indicating a sequence index and a time-domain cyclic shift is provided for the channel estimator. The sequence index and the time-domain cyclic shift are used to generate a pilot sequence to be allocated to UE.

The demultiplexer demultiplexes, based on timing information received from the controller, a signal received from the P/S converter into a control channel signal, a data signal, and a pilot signal. The demapper extracts those signals from a frequency resource based on timing information and frequency allocation information that are received from the controller.

When receiving a signal including control information from UE through the antenna, the CP remover removes a CP from the received signal. The S/P converter converts a signal without the CP into a parallel signal. For a DFT-s-OFDM waveform, the DFT processor performs DFFT processing on the parallel signal. For an OFDM waveform, the DFT processor does not need to be started. After demapping is performed by the demapper, a DFT signal is converted into a time signal in the IFFT processor. Input/Output magnitude of the IFFT processor changes with a control signal received from the controller. The P/S converter serializes the IFFT signal, and the demultiplexer demultiplexes a serial signal into a control channel signal, a pilot signal, and a data signal.

The channel estimator obtains channel estimation from a reference signal received from the demultiplexer. The reference signal may be a DMRS and a TPRS. If there is a TPRS, the TPRS is received; or if there is no TPRS, no TPRS is received. The control channel signal receiver performs, through channel estimation, channel compensation on a control channel signal received from the demultiplexer, and obtains uplink control information sent by a terminal device. The data demodulator and the decoder performs, through channel estimation, channel compensation on a data signal received from the demultiplexer, and then obtains, based on the uplink control information, data sent by the terminal device.

The foregoing describes the structures of the signal transmission system, the terminal device, and the network device. The following describes a signal transmission process between a terminal device and a network device.

Figure 6:
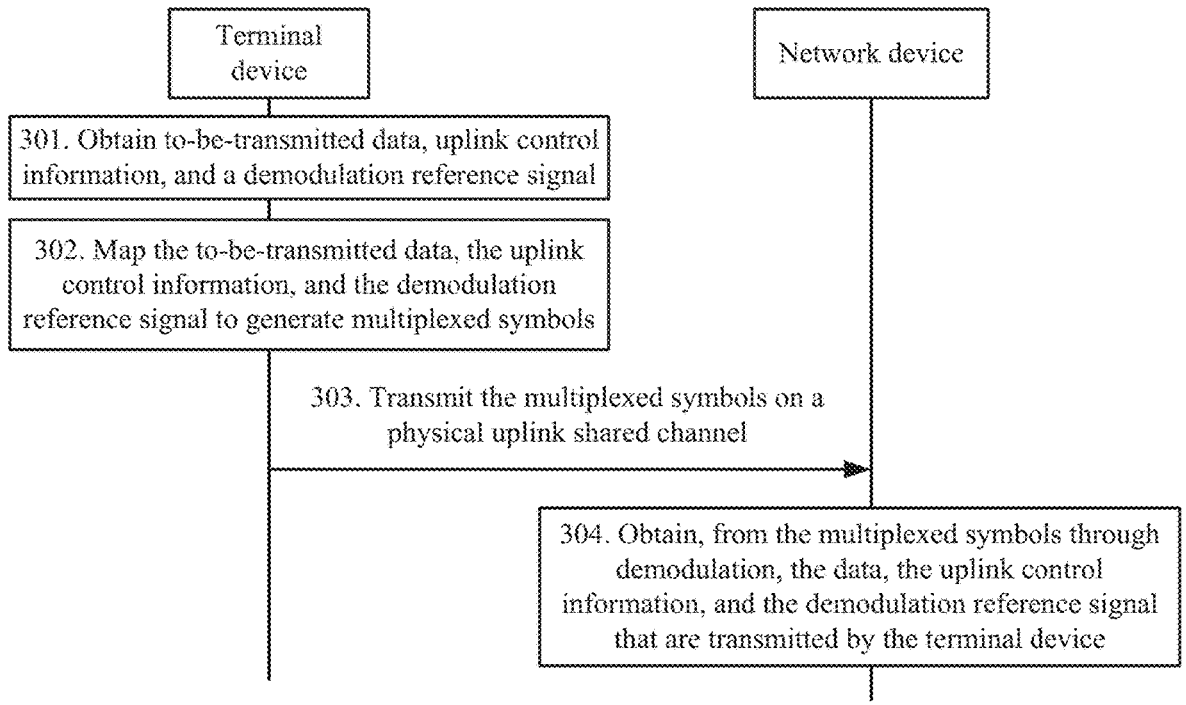
FIG. 6 is a schematic diagram of an embodiment of a signal transmission method according to the embodiments of this application.

As shown in FIG. 6, an embodiment of a signal transmission method provided in the embodiments of this application includes the following steps.

301. A terminal device obtains to-be-transmitted data, uplink control information, and a demodulation reference signal.

302. The terminal device maps the to-be-transmitted data, the uplink control information, and the demodulation reference signal to generate multiplexed symbols.

The multiplexed symbols include discrete Fourier transform spread orthogonal frequency division multiplexing DFT-s-OFDM symbols or orthogonal frequency division multiplexing OFDM symbols. N first multiplexed symbols are located on one side or two sides of a second multiplexed symbol. A location relationship between each of the N first multiplexed symbols and the second multiplexed symbol satisfies a mapping condition. N is an integer greater than or equal to 1. The first multiplexed symbol is a multiplexed symbol to which the uplink control information is mapped. The second multiplexed symbol is a multiplexed symbol to which the demodulation reference signal is mapped.

A multiplexed symbol is a resource element occupied by data or a signal through mapping.

In this embodiment of this application, that a location relationship between each of the N first multiplexed symbols and the second multiplexed symbol satisfies a mapping condition includes: the N first multiplexed symbols are multiplexed symbols closest to the second multiplexed symbol.

Figure 7:
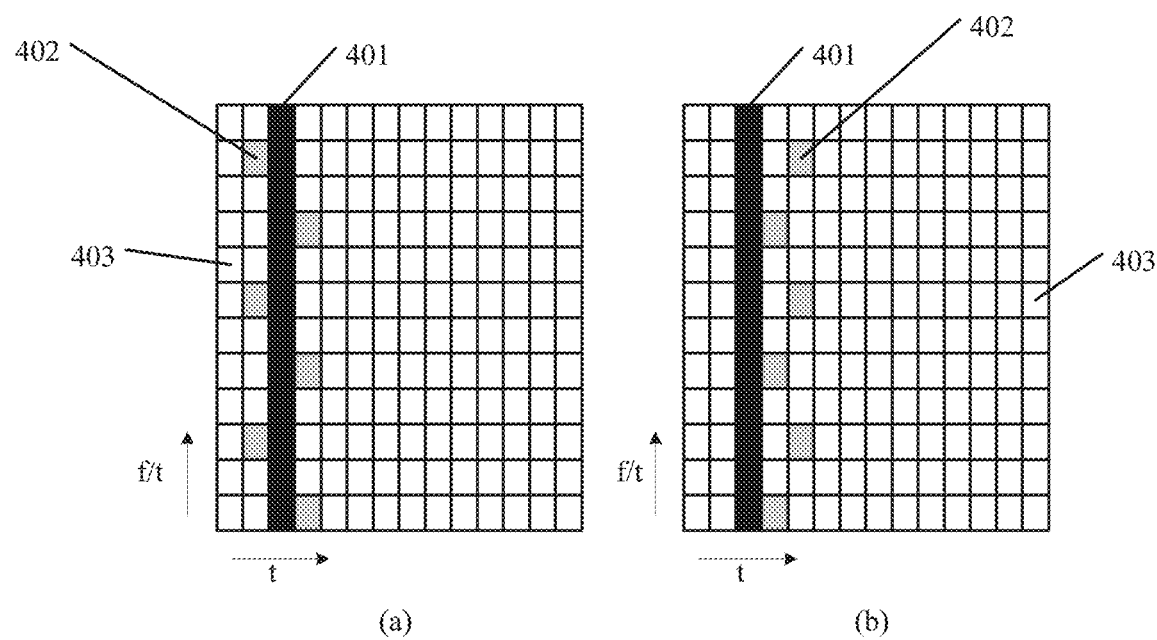
FIG. 7 is a schematic diagram of an example scenario according to an embodiment of this application.

As shown in FIG. 7, 12 grids included in one column from top to bottom indicate one multiplexed symbol, namely, one DFT-s-OFDM symbol or one OFDM symbol. Each grid indicates one modulated symbol. In this example scenario, one multiplexed symbol includes 12 modulated symbols. 401 indicates a multiplexed symbol to which a DMRS is mapped, 402 indicates a modulated symbol to which UCI is mapped, and 403 indicates a modulated symbol to which data is mapped. In the example scenario shown in FIG. 7, no PTRS is mapped. In an example scenario shown in (a) in FIG. 7, a DMRS is mapped to the $3^{rd}$ multiplexed symbol from the left. In this scenario, N=2, and UCI is mapped to two sides of the multiplexed symbol in which the DMRS is located. Therefore, two multiplexed symbols closest to the $3^{rd}$ multiplexed symbol are the $2^{nd}$ and the $4^{th}$ multiplexed symbols. Therefore, as shown in (a) in FIG. 7, the UCI is mapped to the $2^{nd}$ and the $4^{th}$ multiplexed symbols. When N=2, and UCI is mapped to one side of the multiplexed symbol in which the DMRS is located, the $4^{th}$ and the $5^{th}$ multiplexed symbols are closest to the $3^{rd}$ multiplexed symbol, or the $1^{st}$ and the $2^{nd}$ multiplexed symbols are closest to the $3^{rd}$ multiplexed symbol. As shown in (b) in FIG. 7, the UCI is mapped to the $4^{th}$ and the $5^{th}$ multiplexed symbols. A reason of single-side mapping is usually that a multiplexed symbol on one side of the DMRS is not scheduled for the terminal device. For example, in (b) in FIG. 7, only multiplexed symbols on the right side of the DMRS are scheduled for the terminal device.

In the foregoing example scenario, N=2. Certainly, a value of N may be actually an integer greater than or equal to 1.

The multiplexed symbol to which the UCI is mapped is close to the multiplexed symbol to which the DMRS is mapped. This helps quickly demodulate the UCI, so as to improve UCI demodulation performance.

In the foregoing example scenario shown in FIG. 7, no PTRS is mapped. The multiplexed symbol to which the UCI is mapped only needs to be closest to the multiplexed symbol to which the DMRS is mapped. When a PTRS is included, the UCI first needs to be mapped to a multiplexed symbol to which the PTRS is mapped, and then it needs to be ensured that the multiplexed symbol to which the UCI is mapped is closest to the multiplexed symbol to which the DMRS is mapped.

Optionally, when the terminal device further obtains a phase tracking signal, the phase tracking signal is further mapped to the multiplexed symbols; and that a location relationship between each of the N first multiplexed symbols and the second multiplexed symbol satisfies a mapping condition includes: the N first multiplexed symbols are multiplexed symbols to which the phase tracking signal is mapped and that are closest to the second multiplexed symbol.

The network device obtains the phase tracking signal from the multiplexed symbols through demodulation.

When the PTRS is further mapped to the multiplexed symbols, the UCI needs to be mapped to the multiplexed symbol including the PTRS, and the multiplexed symbol to which the UCI needs to be mapped needs to be closest to the multiplexed symbol to which the DMRS is mapped. Certainly, a mapping sequence for mapping the UCI and the PTRS is not limited in this embodiment of this application. A modulated symbol, in the multiplexed symbol, to which the PTRS needs to be mapped may be first determined, then the modulated symbol is reserved, and then the UCI is mapped to another modulated symbol in the multiplexed symbol.

Figure 8:
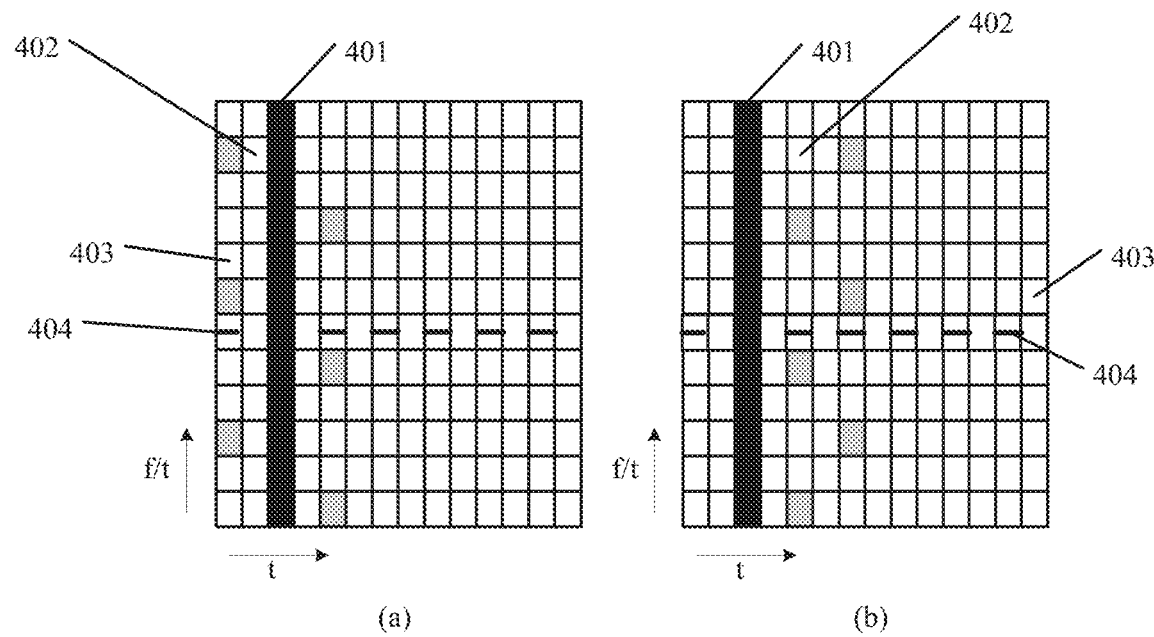
FIG. 8 is a schematic diagram of another example scenario according to an embodiment of this application.

This case may be understood with reference to an example scenario shown in FIG. 8. In FIG. 8, 404 indicates a modulated symbol to which a PTRS is mapped. Certainly, a multiplexed symbol including a modulated symbol to which a PTRS is mapped is a multiplexed symbol to which a PTRS is mapped.

In an example scenario shown in (a) in FIG. 8, a DMRS is mapped to the $3^{rd}$ multiplexed symbol from the left. In this scenario, N=2, and UCI is mapped to two sides of the multiplexed symbol in which the DMRS is located. Therefore, two multiplexed symbols including a PTRS and closest to the $3^{rd}$ multiplexed symbol are the $1^{st}$ and the $5^{th}$ multiplexed symbols. Therefore, as shown in (a) in FIG. 8, the UCI is mapped to the $1^{st}$ and the $5^{th}$ multiplexed symbols. When N=2, and UCI is mapped to one side of the multiplexed symbol in which the DMRS is located, two multiplexed symbols including a PTRS and closest to the $3^{rd}$ multiplexed symbol are the $5^{th}$ and the $7^{th}$ multiplexed symbols. As shown in (b) in FIG. 8, the UCI is mapped to the $5^{th}$ and the $7^{th}$ multiplexed symbols. As shown in (b) in FIG. 8, likewise, only multiplexed symbols on the right side of the DMRS are scheduled for the terminal device, and those on the left side of the DMRS are not scheduled for the terminal device.

PTRS distribution density shown in FIG. 8 is density ½, that is, a PTRS is mapped to every two multiplexed symbols. The PTRS distribution density may alternatively be 1, ¼, or other density. The PTRS distribution density may be determined based on a requirement.

Figure 9:
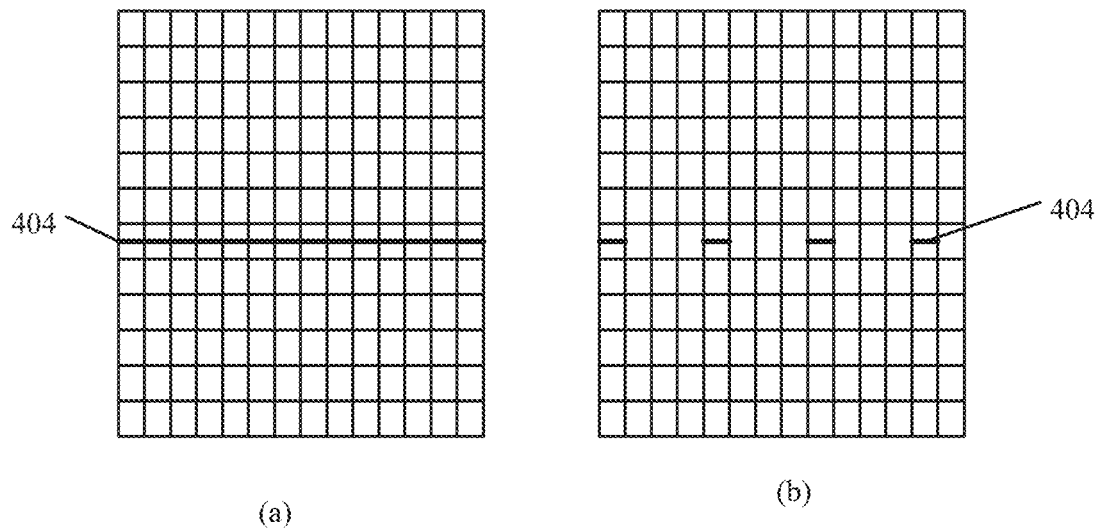
FIG. 9 is a schematic diagram of PTRS distribution density according to an embodiment of this application.

PTRS distribution density shown in (a) in FIG. 9 is 1, that is, a PTRS is mapped to every multiplexed symbol. PTRS distribution density shown in (b) in FIG. 9 is ¼, that is, a PTRS is mapped to every four multiplexed symbols.

When a PTRS is transmitted during uplink transmission of the terminal device, if the PTRS and data have not been inserted when UCI is mapped, a placeholder may be inserted in a bit location corresponding to the PTRS, to avoid collision between the UCI and the PTRS.

303. The terminal device transmits the multiplexed symbols on a physical uplink shared channel.

304. After receiving the multiplexed symbols sent by the terminal device, the network device obtains, from the multiplexed symbols through demodulation, the data, the uplink control information, and the demodulation reference signal that are transmitted by the terminal device.

Optionally, the first multiplexed symbol includes a plurality of modulated symbols. The plurality of modulated symbols include uplink control information modulated symbols and data modulated symbols. The data modulated symbols include a modulated symbol to which the to-be-transmitted data is mapped, or the data modulated symbols include a modulated symbol to which the to-be-transmitted data is mapped and a modulated symbol to which the phase tracking reference signal is mapped.

When the multiplexed symbols are the OFDM symbols, the uplink control information modulated symbols are distributed in the plurality of modulated symbols at a uniform spacing.

Figure 10:
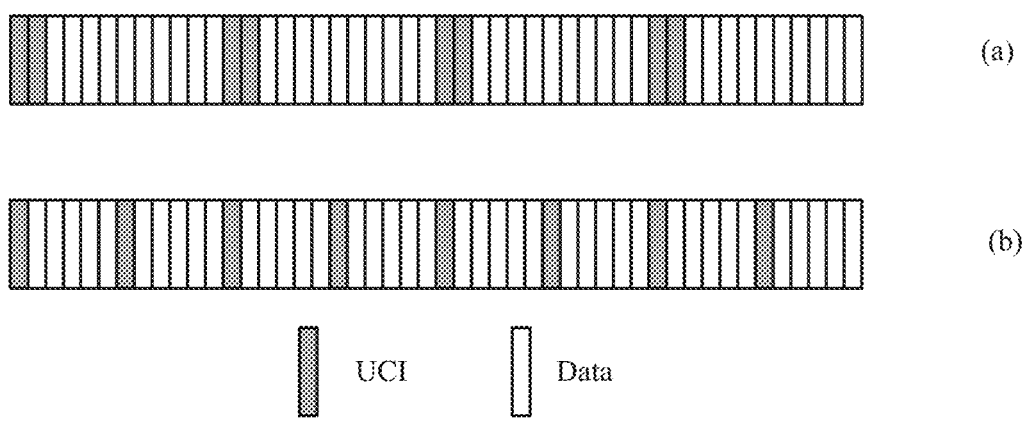
FIG. 10 is a schematic diagram of an example of an arrangement pattern of UCI modulated symbols and data modulated symbols according to an embodiment of this application.

The uplink control information modulated symbol is a modulated symbol to which the UCI is mapped. The data modulated symbol is a modulated symbol to which the to-be-transmitted data is mapped, or a modulated symbol to which the to-be-transmitted data and the phase tracking reference signal (Phase Tracking Reference Signal, PTRS) are mapped. For the UCI modulated symbol, every M UCI modulated symbols may be distributed at a spacing of Q data modulated symbols. Q is an integer greater than or equal to 1, M is an integer greater than or equal to 1, and M may be equal to 1 or 2. Mapping to the data modulated symbol and the uplink control information modulated symbol may be understood with reference to (a) and (b) in FIG. 10. (a) in FIG. 10 includes one multiplexed symbol, corresponding to one DFT-s-OFDM symbol or one OFDM symbol. (b) in FIG. 10 includes one multiplexed symbol, corresponding to one DFT-s-OFDM symbol or one OFDM symbol. For example, (a) in FIG. 10 shows a pattern when M=2 and (b) in FIG. 10 shows a pattern when M=1. For example, if M×Q UCI modulated symbols are mapped to one OFDM symbol or one DFT-s-OFDM symbol, the M×Q UCI modulated symbols are divided into Q groups. Each group includes M symbols. The Q groups of UCI modulated symbols are evenly distributed in frequency domain. For example, in (a) in FIG. 10, Q=4, and M=2; and in (b) in FIG. 10, Q=8, and M=1.

This mapping manner for performing mapping to the data modulated symbol and the UCI modulated symbol can ensure that an OFDM waveform obtains a frequency-domain diversity gain, thereby improving demodulation performance. In addition, using a same design principle for DFT-s-OFDM and OFDM can reduce protocol complexity.

The mapping manner for performing mapping to the data modulated symbol and the uplink control information modulated symbol may also be referred to as a uniform discrete mapping manner.

Figure 11:
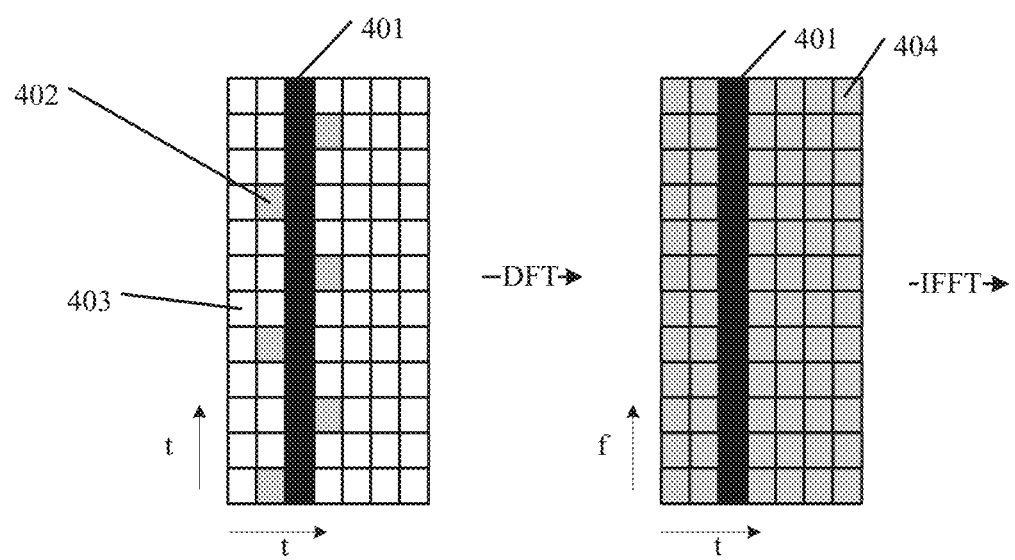
FIG. 11 is a schematic diagram of an example of a DFT-s-OFDM signal processing procedure according to an embodiment of this application.

The following describes a uniform discrete mapping manner for DFT-s-OFDM with reference to FIG. 11. In FIG. 11, M=1. (a) in FIG. 11 is a resource grid diagram before DFT is performed. 12 grids included in one column from top to bottom indicate one multiplexed symbol, corresponding to one DFT-s-OFDM symbol or one OFDM symbol. For a DFT-s-OFDM waveform, UCI mapping is time-domain mapping. As shown in (a) in FIG. 11, 401 indicates a reserved DMRS symbol, 402 indicates a UCI symbol to which UCI is mapped. 403 indicates a data symbol to which data is mapped. After UCI is mapped, DFT transform is performed, to obtain (b) in FIG. 11. In (b) in FIG. 11, 401 indicates a DMRS inserted after the DFT is performed, and another symbol indicated by 404 is a frequency-domain resource element, and is a value obtained after DFT transform is performed on data and UCI.

Figure 12:
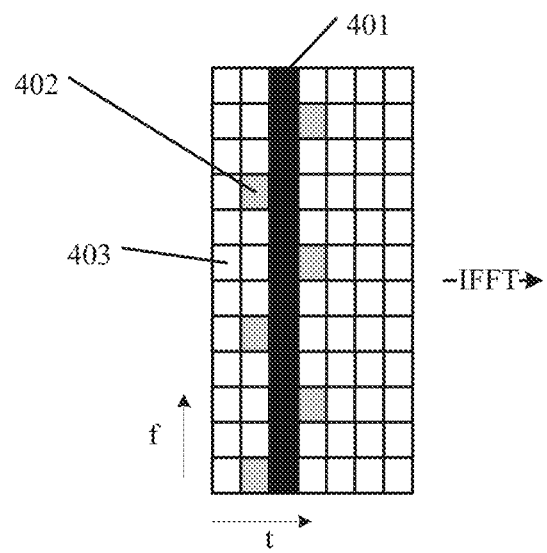
FIG. 12 is a schematic diagram of an example of an OFDM signal processing procedure according to an embodiment of this application.

FIG. 12 shows uniform discrete mapping for OFDM. There is no DFT process for the OFDM, and a DMRS, UCI, and the like are all inserted in frequency domain. 401 indicates a symbol to which a DMRS is mapped, 402 indicates a symbol to which UCI is mapped, and 403 indicates a symbol to which data is mapped.

It should be noted that the uniform discrete mapping indicates that a spacing between UCI modulated symbols is uniform, but a mapping start location is not limited. For example, UCI mapping start locations on two sides of a DMRS in FIG. 12 are different, but both mapping manners belong to uniform discrete mapping.

Optionally, in another embodiment of the signal transmission method provided in this embodiment of this application, the method further includes: determining, by the terminal device, a modulation scheme for the uplink control information based on a modulation scheme for the to-be-transmitted data; and respectively modulating, by the terminal device, the to-be-transmitted data and the uplink control information based on the modulation scheme for the to-be-transmitted data and the modulation scheme for the uplink control information.

The determining, by the terminal device, a modulation scheme for the uplink control information based on a modulation scheme for the to-be-transmitted data includes:
  if the multiplexed symbols are the DFT-s-OFDM symbols, when the to-be-transmitted data is modulated in a manner of π/2 binary phase shift keying BPSK, the modulation scheme for the uplink control information is the π/2 BPSK; or
  if the multiplexed symbols are the OFDM symbols, when the to-be-transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

Correspondingly, for the network device, in another embodiment of the signal transmission method provided in this embodiment of this application, the method may further include:

determining, by the network device, a modulation scheme for the uplink control information based on a modulation scheme for the transmitted data; and the obtaining, by the network device from the multiplexed symbols through demodulation, the data, the uplink control information, and the demodulation reference signal that are transmitted by the terminal device includes:

obtaining, by the network device, the transmitted data from the multiplexed symbols through demodulation based on the modulation scheme for the transmitted data, and obtaining, from the first multiplexed symbol through demodulation based on the modulation scheme for the uplink control information, the uplink control information sent by the terminal device.

The determining, by the network device, a modulation scheme for the uplink control information based on a modulation scheme for the transmitted data includes:

if the multiplexed symbols are the DFT-s-OFDM symbols, when the transmitted data is modulated in a manner of π/2 binary phase shift keying BPSK, the modulation scheme for the uplink control information is the π/2 BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

A description of a relationship between the modulation scheme for the to-be-transmitted data and that for the UCI may be represented in a form of a table. For example, Table 1 shows a relationship between a modulation scheme for data and that for UCI in LTE, Table 2 shows a relationship between a modulation scheme for data and that for UCI for DFT-s-OFDM in NR, and Table 3 shows a relationship between a modulation scheme for data and that for UCI for OFDM in NR.

TABLE 1

Relationship between a modulation scheme for data and that for UCI in LTE

| Modulation scheme for data | Modulation scheme for an RI and a HARQ | Modulation scheme for other UCI |
|---|---|---|
| QPSK | QPSK | QPSK |
| 16QAM | 16QAM (outermost constellation point used) = QPSK | 16QAM |
| 64QAM | 64QAM (outermost constellation point used) = QPSK | 64QAM |

Figure 13:
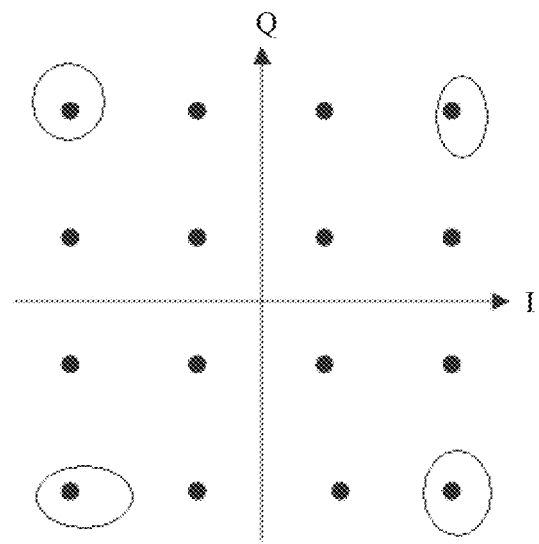
FIG. 13 is a schematic diagram of 16QAM constellation according to an embodiment of this application.

In Table 1, the outermost constellation point is used for the 16QAM. As shown in FIG. 13, the 16QAM is equivalent to the QPSK modulation. The 64QAM is also equivalent to the QPSK modulation when the outermost constellation point is used.

TABLE 2

Relationship between a modulation scheme for data and that for UCI for DFT-s-OFDM in NR

| Modulation scheme for data | Modulation scheme for an RI and a HARQ | Modulation scheme for other UCI |
|---|---|---|
| π/2-BPSK | π/2-BPSK | π/2-BPSK |
| QPSK | QPSK | QPSK |
| 16QAM | 16QAM (outermost constellation point used) = QPSK | 16QAM |
| 64QAM | 64QAM (outermost constellation point used) = QPSK | 64QAM |

In Table 2, the outermost constellation point is used for the 16QAM. As shown in FIG. 13, the 16QAM is equivalent to the QPSK modulation. The 64QAM is also equivalent to the QPSK modulation when the outermost constellation point is used.

TABLE 3

Relationship between a modulation scheme for data and that for UCI for OFDM in NR

| Modulation scheme for data | Modulation scheme for an RI and a HARQ | Modulation scheme for other UCI |
|---|---|---|
| QPSK | QPSK | QPSK |
| 16QAM | QPSK | 16QAM |
| 64QAM | QPSK | 64QAM |

In Table 3, the QPSK modulation is directly used for the 16QAM and the 64QAM.

In LTE, a same modulation scheme and same power allocation are used for the data and the UCI information other than the RI and the HARQ. For the RI and the HARQ information, the QPSK modulation is always used, and when the 16QAM and 64QAM modulation are used for the data, the UCI is sent on the outermost constellation point, equivalent to using QPSK modulation with boosted power.

As shown in Table 2, in NR, the π/2-BPSK modulation is used for the DFT-s-OFDM waveform. When the π/2-BPSK modulation is used for the data, a modulation scheme for all UCI should be limited to the π/2-BPSK to maintain a low PAPR. The 16QAM and the 64QAM modulation may be degraded to the QPSK modulation when the outermost constellation point is used. This can improve power of important UCI without improving a PAPR on a PUSCH.

For the OFDM waveform, the π/2-BPSK modulation is not used for the data. A modulation scheme for the UCI is shown in Table 3, and is basically the same as that in LTE. However, a manner of improving symbol power for the OFDM is different from that for the DFT-s-OFDM, and the outermost constellation point does not need to be used, but the QPSK modulation may be directly used. This can directly improve the symbol power by a specified value.

For the OFDM waveform, the modulation scheme for the UCI is selected more flexibly. A modulation scheme for information such as a CQI and a PMI may be kept consistent with that for the data, and the QPSK modulation may be still used for the RI and the HARQ feedback information to improve robustness. In addition, for the OFDM waveform, a power improvement value may be independently configured for different UCI. For the OFDM, a power offset relative to a data symbol may be specified for a UCI symbol. Demodulation performance can be improved by improving power of the UCI.

The UCI information usually includes only 1 bit or 2 bits. Modulation schemes for 1-bit or 2-bit UCI information include the following:

In LTE, a modulation scheme for UCI (a 1-bit or 2-bit HARQ and RI) is implemented at a UCI encoding stage. Details are shown in the following table for LTE. The first column in the table indicates data modulation orders, and 2, 4, and 6 respectively correspond to the QPSK, the 16QAM, and the 64QAM, $o_0^{ACK}$ and $o_1^{ACK}$, indicate 2 HARQ information bits, $o_2^{ACK}=(o_0^{ACK}+o_1^{ACK})\mod 2$, and y and x are placeholders (placeholders), and can ensure that the QPSK modulation is used for final HARQ information and that the outermost constellation point is used for the 16QAM and the 64QAM.

TABLE 4

Encoding of 1-bit HARQ-ACK information

| Modulation order $Q_m$ | Encoded HARQ-ACK |
|---|---|
| 2 | $[o_0^{ACK}\, y]$ |
| 4 | $[o_0^{ACK}\, y\, x\, x]$ |
| 6 | $[o_0^{ACK}\, y\, x\, x\, x\, x]$ |

TABLE 5

Encoding of 2-bit HARQ-ACK information

| Modulation order $Q_m$ | Encoded HARQ-ACK |
|---|---|
| 2 | $[o_0^{ACK}\, o_1^{ACK}\, o_2^{ACK}\, o_0^{ACK}\, o_1^{ACK}\, o_2^{ACK}]$ |
| 4 | $[o_0^{ACK}\, o_1^{ACK}\, x\, x\, o_2^{ACK}\, o_0^{ACK}\, o_1^{ACK}\, x\, x\, o_2^{ACK}\, x\, x]$ |
| 6 | $[o_0^{ACK}\, o_1^{ACK}\, x\, x\, x\, x\, o_2^{ACK}\, o_0^{ACK}\, x\, x\, x\, x\, o_1^{ACK}\, o_2^{ACK}\, x\, x\, x\, x]$ |

In NR, after the π/2-BPSK modulation is introduced, the tables are respectively modified into the following.

TABLE 6

Encoding of 1-bit HARQ-ACK information

| $Q_m$ | Encoded HARQ-ACK |
|---|---|
| 1 | $o_0^{ACK}$ |
| 2 | $[o_0^{ACK}\, y]$ |
| 4 | $[o_0^{ACK}\, y\, x\, x]$ |
| 6 | $[o_0^{ACK}\, y\, x\, x\, x\, x]$ |

TABLE 7

Encoding of 2-bit HARQ-ACK information

| $Q_m$ | Encoded HARQ-ACK |
|---|---|
| 1 | $[o_0^{ACK}\, o_1^{ACK}\, o_2^{ACK}]$ |
| 2 | $[o_0^{ACK}\, o_1^{ACK}\, o_2^{ACK}\, o_0^{ACK}\, o_1^{ACK}\, o_2^{ACK}]$ |
| 4 | $[o_0^{ACK}\, o_1^{ACK}\, x\, x\, o_2^{ACK}\, o_0^{ACK}\, x\, x\, o_1^{ACK}\, o_2^{ACK}\, x\, x]$ |
| 6 | $[o_0^{ACK}\, o_1^{ACK}\, x\, x\, x\, x\, o_2^{ACK}\, o_0^{ACK}\, x\, x\, x\, x\, o_1^{ACK}\, o_2^{ACK}\, x\, x\, x\, x]$ |

In Table 6 and Table 7, when the QPSK or a modulation scheme at a higher modulation order is used for the data, the QPSK modulation is always used for the UCI, and the outermost constellation point is used, or when the π/2-BPSK modulation is used for the data, the π/2-BPSK modulation is used for the UCI.

It should be noted that a procedure that is the same as that for the HARQ is used for a 1-bit or 2-bit RI. Details are not repeatedly described herein.

A DMRS includes a front-loaded DMRS multiplexed symbol. The front-loaded DMRS multiplexed symbol is a single DMRS multiplexed symbol or two consecutive DMRS multiplexed symbols, different from two discrete DMRS multiplexed symbols in LTE. In this case, at least one of the RI and the HARQ feedback information is mapped only to two multiplexed symbols on two sides of the front-loaded DMRS multiplexed symbol.

When the terminal device has only the front-loaded DMRS multiplexed symbol, the RI and the HARQ feedback information are mapped to a symbol closest to the DMRS.

When an additional DMRS (Additional DMRS) for a high-speed scenario is configured for the terminal device, some RIs and HARQ feedback information are mapped to two sides of a front-loaded DMRS, and remaining RIs and HARQ feedback information are mapped to two sides of the additional DMRS.

When the terminal device has no additional DMRS but a PTRS is configured for the terminal device, the RI and the HARQ feedback information are mapped to an OFDM symbol or a DFT-s-OFDM symbol including the PTRS.

Figure 14:
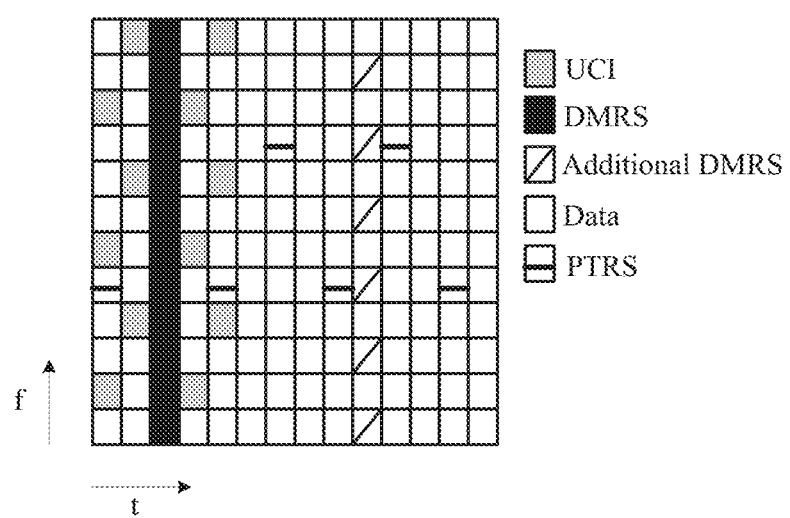
FIG. 14 is a schematic diagram of distribution of various types of modulated symbols according to an embodiment of this application.

FIG. 14 shows mapping locations of a front-loaded DMRS, UCI, an additional (additional) DMRS, a phase tracking reference signal PTRS, and uplink data. An OFDM waveform is used. A location of the UCI should be preferentially close to the DMRS and is then close to the additional DMRS, and is finally mapped to a symbol in which the PTRS is located. An idea of a mapping manner for DFT-s-OFDM is the same as that for OFDM. A difference lies in that UCI and a PTRS are mapped in time domain.

In NR, PTRS signals are configured for some or all OFDM or DFT-s-OFDM waveforms. FIG. 14 shows impact of DMRS and PTRS symbols on UCI mapping.

UCI such as a CQI and a PMI should be mapped to all symbols that allow mapping. A location of a reference signal needs to be considered for determining a mapping location of important UCI such as an RI and a HARQ feedback.

Figure 15:
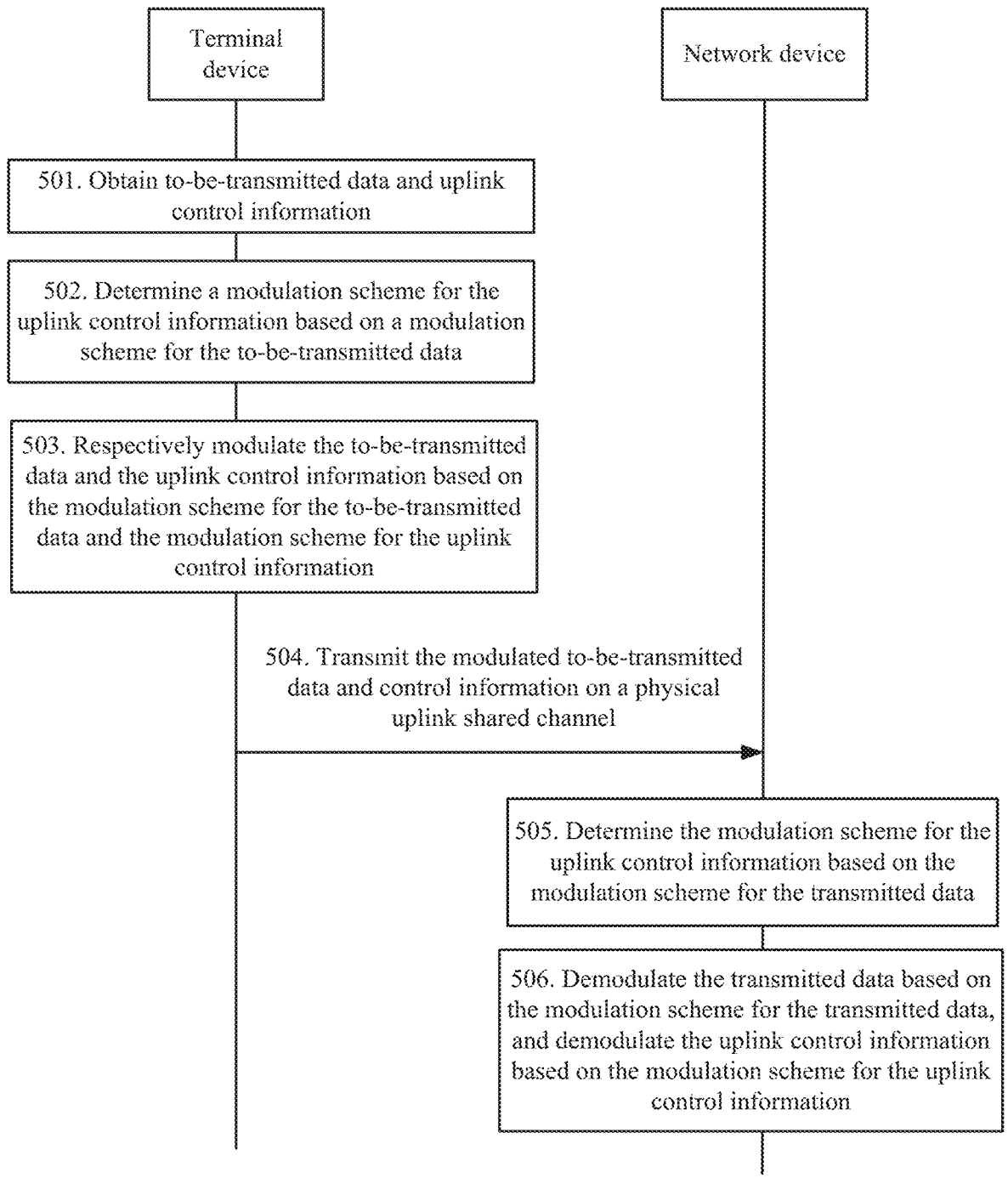
FIG. 15 is a schematic diagram of another embodiment of a signal transmission method according to the embodiments of this application.

The foregoing signal transmission process in which the terminal device determines the modulation scheme for the uplink control information based on the modulation scheme for the to-be-transmitted data may be further understood with reference to FIG. 15.

As shown in FIG. 15, an embodiment of a signal transmission method provided in the embodiments of this application includes the following steps.

501. A terminal device obtains to-be-transmitted data and uplink control information.

502. The terminal device determines a modulation scheme for the uplink control information based on a modulation scheme for the to-be-transmitted data.

The determining, by the terminal device, a modulation scheme for the UCI based on a modulation scheme for the to-be-transmitted data may include: if the multiplexed symbols are the DFT-s-OFDM symbols, when the to-be-transmitted data is modulated in a manner of π/2 binary phase shift keying BPSK, the modulation scheme for the uplink control information is the π/2 BPSK; or if the multiplexed symbols are the OFDM symbols, when the to-be-transmitted data is modulated in a manner of quadrature amplitude modulation (QAM), a modulation scheme for first-type information in the uplink control information is quadrature phase shift keying QPSK, where the first-type information includes at least one of a rank indicator RI and a hybrid automatic repeat request HARQ indication. If the multiplexed symbols are the DFT-s-OFDM symbols, when the to-be-transmitted data is not modulated in the manner of the π/2 BPSK, the modulation scheme for the uplink control information may be the QPSK. The UCI may include the first-type information and second-type information. The first-type information may include an RI and a HARQ indication. The second-type information may include a CQI, a PMI, CSI, a CRI, and the like. The HARQ indication is HARQ information with a bit quantity less than a specific bit quantity, for example, the HARQ information includes 1 bit or 2 bits. The RI information is also RI information with a bit quantity less than a specific bit quantity, for example, the RI information includes 1 bit or 2 bits. The QAM includes 16QAM, 64QAM, 256QAM, and the like. The QPSK is a standard-preset QPSK constellation diagram, and may be different from an outermost constellation point of the QAM. A data modulation scheme may be further indicated by a modulation order, for example, modulation orders $Q_m$ 1, 2, 4, 6, and 8 respectively corresponding to the π/2-BPSK, the QPSK, the 16QAM, the 64QAM, and the 256QAM. It can be learned from the first possible implementation of the third aspect that a PAPR of the to-be-transmitted data does not increase when the modulation scheme for the uplink control information is the π/2 BPSK, and modulation robustness can be improved when the modulation scheme for the first-type information in the uplink control information is the quadrature phase shift keying QPSK.

503. The terminal device respectively modulates the to-be-transmitted data and the uplink control information based on the modulation scheme for the to-be-transmitted data and the modulation scheme for the uplink control information.

504. Transmit the modulated to-be-transmitted data and control information on a physical uplink shared channel.

505. After receiving the modulated transmitted data and uplink control information that are sent by the terminal device, a network device determines the modulation scheme for the uplink control information based on the modulation scheme for the transmitted data.

The determining, by the network device, the modulation scheme for the uplink control information based on the modulation scheme for the transmitted data may include: if the multiplexed symbols are the DFT-s-OFDM symbols, when the transmitted data is modulated in a manner of T/2 binary phase shift keying BPSK, the modulation scheme for the uplink control information is the π/2 BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication. If the multiplexed symbols are the DFT-s-OFDM symbols, when the to-be-transmitted data is not modulated in the manner of the π/2 BPSK, the modulation scheme for the uplink control information may be the QPSK. The UCI may include the first-type information and second-type information. The first-type information may include an RI and a HARQ indication. The second-type information may include a CQI, a PMI. CSI, a CRI, and the like. The HARQ indication is HARQ information with a bit quantity less than a specific bit quantity, for example, the HARQ information includes 1 bit or 2 bits. The RI information is also RI information with a bit quantity less than a specific bit quantity, for example, the RI information includes 1 bit or 2 bits. The QAM includes 16QAM, 64QAM, 256QAM, and the like. The QPSK is a standard-preset QPSK constellation diagram, and may be different from an outermost constellation point of the QAM. A data modulation scheme may be further indicated by a modulation order, for example, modulation orders $Q_m$ 1, 2, 4, 6, and 8 respectively corresponding to the π/2-BPSK, the QPSK, the 16QAM, the 64QAM, and the 256QAM. It can be learned from the first possible implementation of the fourth aspect that a PAPR of the to-be-transmitted data does not increase when the modulation scheme for the uplink control information is the π/2 BPSK, and modulation robustness can be improved when the modulation scheme for the first-type information in the uplink control information is the quadrature phase shift keying QPSK.

506. The network device demodulates the transmitted data based on the modulation scheme for the transmitted data, and demodulates the uplink control information based on the modulation scheme for the uplink control information.

In addition, in the embodiments of this application, when uplink data is transmitted by using a DFT-s-OFDM waveform, modulation in a manner of π/2 BPSK can reduce a PAPR of the uplink data. If a demodulation reference signal DMRS is mapped to a physical uplink shared channel and transmitted together with the uplink data, the DMRS causes an increase in the PAPR of the uplink data. Therefore, to prevent the DMRS from causing an increase in the PAPR of the uplink data, the embodiments of this application provide a processing solution shown in FIG. 16.

Figure 16:
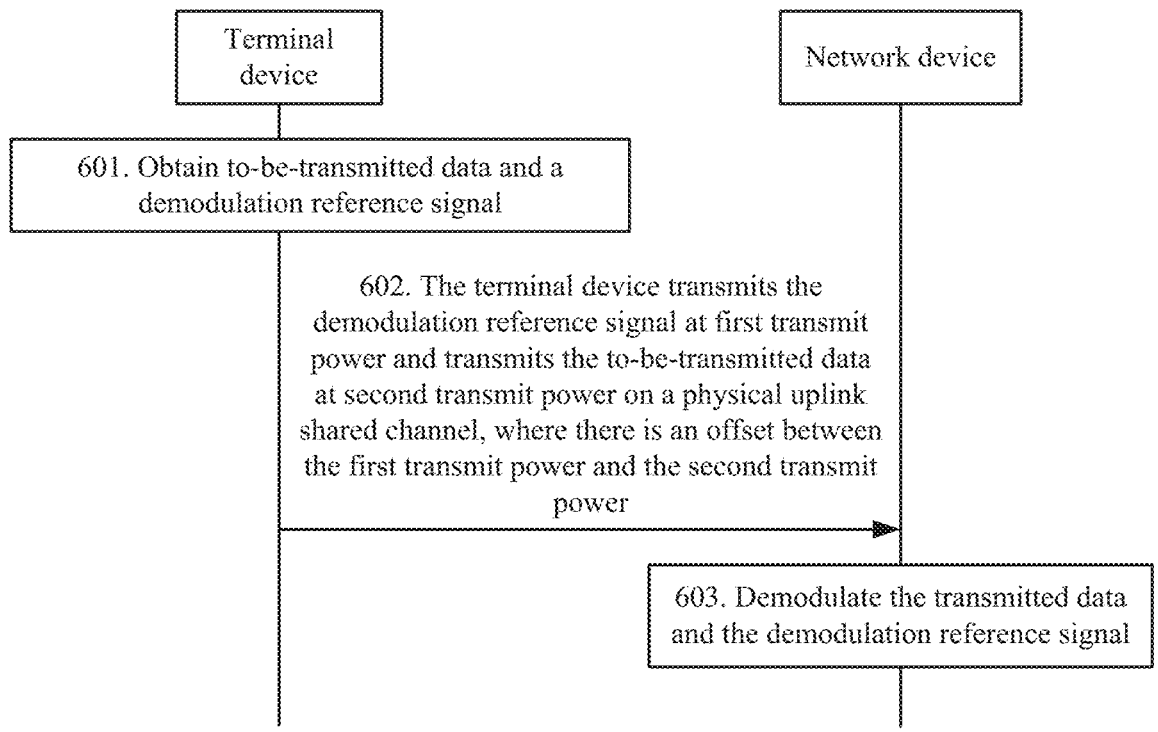
FIG. 16 is a schematic diagram of another embodiment of a signal transmission method according to the embodiments of this application.

As shown in FIG. 16, an embodiment of a signal transmission method provided in the embodiments of this application includes the following steps.

601. A terminal device obtains to-be-transmitted data and a demodulation reference signal.

The demodulation reference signal DMRS is used for demodulation related to uplink control and a data channel.

A waveform used for the to-be-transmitted data and the demodulation reference signal is a discrete Fourier transform spread orthogonal frequency division multiplexing DFT-s-OFDM waveform, and a modulation scheme for the to-be-transmitted data isπ/2 binary phase shift keying BPSK modulation.

BPSK is one of conversion manners of converting an analog signal into a data value, and is a manner of representing information phase shift keying by using complex-valued waveforms with different phases. A reference sine wave and a phase-reversed wave are used in the BPSK. One of the reference sine wave and the phase-reversed wave is 0, and the other is 1, so that 2-value (1-bit) information can be sent or received.

π/2 BPSK means rotating a phase by π/2 based on the BPSK.

602. The terminal device transmits the demodulation reference signal at first transmit power and transmits the to-be-transmitted data at second transmit power on a physical uplink shared channel, where there is an offset between the first transmit power and the second transmit power.

The first power may be represented by using P1, the second power may be represented by using P2, and the offset may be represented by using XF. A relationship between P1. P2, and XF may be expressed as P2−P1=XF. A value of XF may be positive, negative, or 0.

P2 is transmit power of the to-be-transmitted data, and P2 may be determined by the terminal device. For example, the terminal device may calculate P2 based on a current transmission capability, or the terminal device performs adjustment based on current transmit power to obtain P2. The terminal device usually has maximum transmit power, and the terminal device may select appropriate transmit power within a range of the maximum transmit power. Alternatively, P2 may be determined by the terminal device together with a base station. For example, current transmit power of the terminal device is P0. If the base station instructs, by using a signaling message, the terminal device to increase the transmit power by Y. P2=P0+Y; or if the base station instructs, by using a signaling message, the terminal device to decrease the transmit power by Y. P2=P0−Y. A unit of the transmit power is dB.

After P2 is determined, if the value of XF is determined, P1 can be determined based on the relationship between P1, P2, and XF.

The physical uplink shared channel PUSCH is a data channel.

603. After receiving modulated data and a modulated demodulation reference signal that are transmitted by the terminal device, a network device demodulates the transmitted data and the demodulation reference signal.

A waveform used for the transmitted data and the demodulation reference signal is a discrete Fourier transform spread orthogonal frequency division multiplexing DFT-s-OFDM waveform, and a modulation scheme for the transmitted data is π/2 binary phase shift keying BPSK modulation.

In this embodiment of this application, there are the following several solutions for determining the value of XF and P1. The following separately describes the solutions.

Solution 1: The first transmit power is determined by the terminal device, and the first transmit power is less than the second transmit power.

Solution 1 is a power back-off solution. In Solution 1, a range or a specific value of power back-off is not stipulated, that is, the value of XF or a value range of XF is not stipulated. A value of P1 is fully determined by the terminal device, in other words, it only needs to be satisfied that P1 is less than P2.

Solution 2: The first transmit power is determined by the terminal device, the offset is less than a value X, the first transmit power is less than the second (A) transmit power, and the offset falls within an adjustment range. X is a preset value or is notified by the network device to the terminal device. X is delivered by the network device to the terminal device by using signaling.

In Solution 2, P1 is less than P2, and a back-off range of P1 is pre-stipulated. For example, it is pre-stipulated that P1 is less than P2, and is not less than P2−X. In this case, a value only needs to be selected between P2 and P−X as P1. For example, X=3 dB, and P2=18 dB. In this case, a value only needs to be selected between 18 dB and 15 dB as P1. P1 may be 16 dB or 17 dB, or certainly, may be another value within this range.

A value of X may be a preset value, or may be notified by a base station to the terminal device by using signaling. For example, the value of X may be notified by the base station to the terminal device by using radio resource control (RRC) or (DCI for short in English) signaling. Certainly, the value of X may alternatively be notified to the terminal device by using other signaling or another message, not limited to the RRC signaling or the DCI signaling. Alternatively, a recommended value of X may be reported by the terminal device to the base station, and the base station confirms the value and notifies the value to the terminal device.

Solution 3: The offset is a preset value, and different configuration information of the demodulation reference signal corresponds to different offsets.

To be specific, the first transmit power is determined based on the second transmit power and the offset, the offset corresponds to the configuration information of the demodulation reference signal, and different configuration information corresponds to different offsets.

Figure 17:
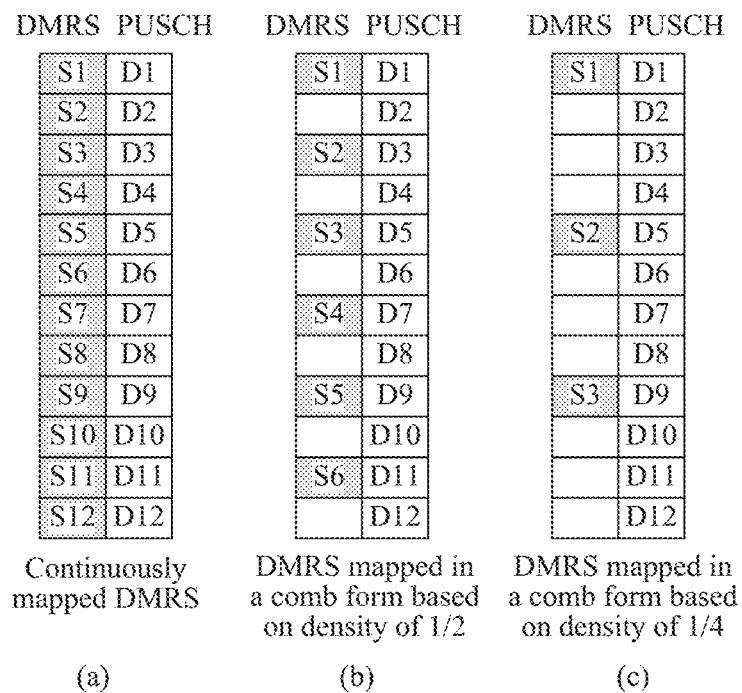
FIG. 17 is a schematic diagram of various DMRS mapping structures according to an embodiment of this application.

In Solution 3, a specific value of power back-off is stipulated, and the value is related to a DMRS configuration. For example, as shown in (a) in FIG. 17, if the DMRS is continuously mapped in frequency domain, a power difference between P2 and P1, namely, P2−P1, is X1; as shown in (b) in FIG. 17, if the DMRS is mapped in a comb form based on density of ½, a power difference between P2 and P1, namely, P2−P1, is X2; as shown in (c) in FIG. 17, if the DMRS is mapped in a comb form based on density of ¼, a power difference between P2 and P1, namely, P2−P1, is X3. Values of X1, X2, and X3 are different. Particularly, the power herein is energy per resource element (EPRE), and the power difference is an EPRE difference. Herein, a specific example is provided. If P2=18 dB, X1=3 dB, X2=0 dB, and X3=−3 dB, when X1=3 dB, correspondingly, P1=18−3=15 dB; when X2=0 dB, correspondingly, P1=18−0=18 dB; when X3=−3 dB, correspondingly, P1=18−(−3) =21 dB. In this scenario of Solution 3, when P1 is less than P2, impact of a PAPR of a DMRS on a PAPR of uplink data can be reduced when the DMRS is transmitted on a PUSCH together with the uplink data. When P1 is greater than P2, in other words, impact of a PAPR of a DMRS on a PAPR of uplink data is relatively small, overall transmission performance can be improved by improving transmit power of the DMRS.

Solution 4: The offset is a preset value, and different scheduled bandwidths correspond to different offsets. A transmission resource corresponding to the scheduled bandwidth is used to transmit the to-be-transmitted data and the demodulation reference signal.

In Solution 4, the first transmit power is determined based on the second transmit power and the offset, the offset corresponds to the scheduled bandwidth, and different scheduled bandwidths correspond to different offsets. The transmission resource corresponding to the scheduled bandwidth is used to transmit the to-be-transmitted data and the demodulation reference signal.

In Solution 4, a specific value of power adjustment, namely, the value of XF, is stipulated. The value of XF is related to the scheduled bandwidth, because a PAPR has a relatively strong correlation with the scheduled bandwidth. The scheduled bandwidth is an available bandwidth for transmitting uplink data and a DMRS. For example, a correlation between a scheduled bandwidth and a power back-off value may be established based on Table 4. The terminal device selects a value of X based on a current scheduled bandwidth.

TABLE 8

Relationship between a scheduled bandwidth and a power adjustment value

| Scheduled bandwidth N (PRB) | Power adjustment value XF (dB) |
|---|---|
| N < N1 | X1 |
| N1 ≤ N < N2 | X2 |
| N ≥ N2 | X3 |

In this case, when the scheduled bandwidth N<N1, XF=X1, and P1=P2−X1; when N1≤the scheduled bandwidth N<N2, XF=X2, and P1=P2−X2; or when the scheduled bandwidth N≥N2, XF=X3, and P1=P2−X3.

The foregoing describes the solutions in which transmit power P1 of a DMRS is adjusted to avoid an increase in a PAPR of uplink data when the DMRS is transmitted on a PUSCH together with the uplink data. The embodiments of this application further provide another solution shown in FIG. 18, to avoid an increase in a PAPR of uplink data when a DMRS is transmitted on a PUSCH together with the uplink data.

Figure 18:
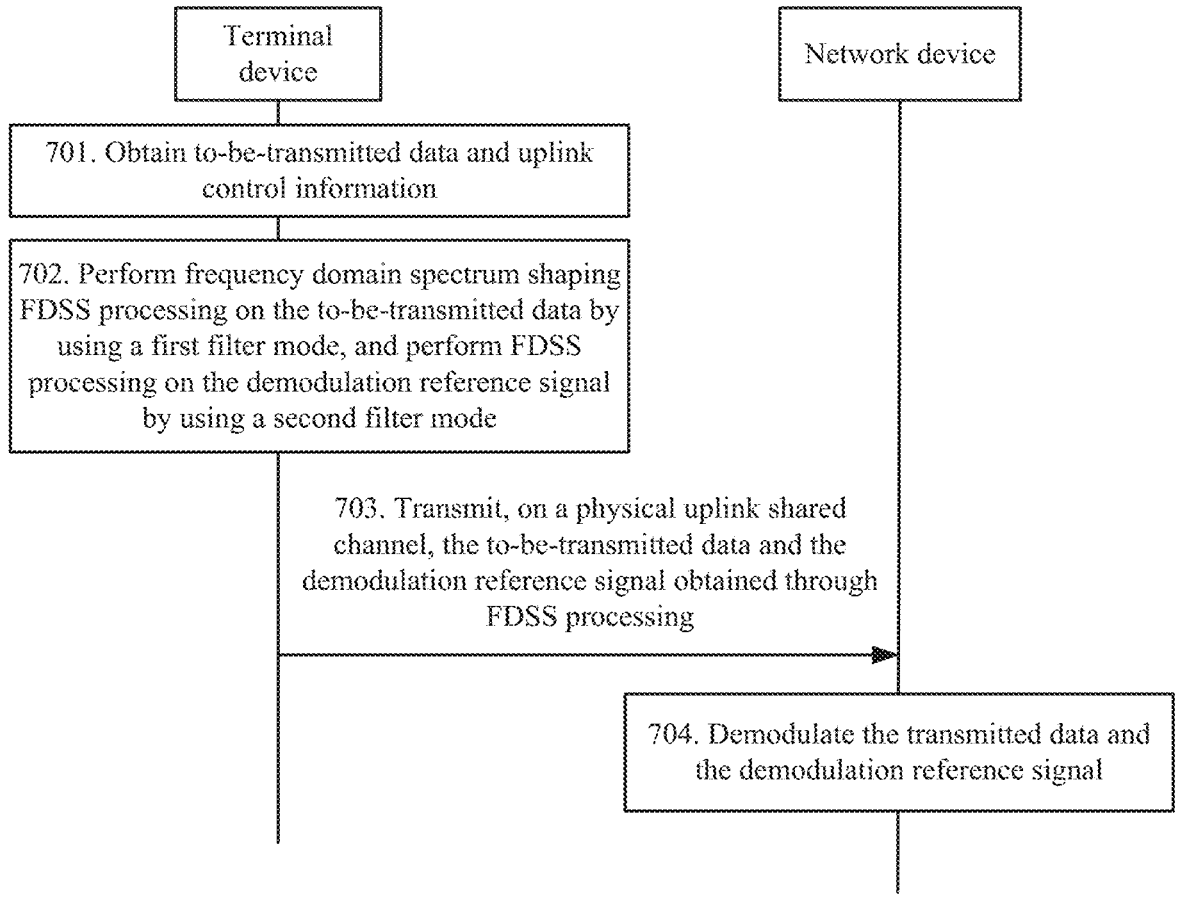
FIG. 18 is a schematic diagram of another embodiment of a signal transmission method according to the embodiments of this application.

As shown in FIG. 18, an embodiment of a signal transmission method provided in the embodiments of this application includes the following steps.

701. A terminal device obtains to-be-transmitted data and a demodulation reference signal.

A waveform used for the to-be-transmitted data and the demodulation reference signal is a discrete Fourier transform spread orthogonal frequency division multiplexing DFT-s-OFDM waveform, and a modulation scheme for the to-be-transmitted data is π/2 binary phase shift keying BPSK modulation.

702. The terminal device performs frequency domain spectrum shaping FDSS processing on the to-be-transmitted data by using a first filter mode, and performs FDSS processing on the demodulation reference signal by using a second filter mode.

A roll-off degree of the first filter mode is higher than a roll-off degree of the second filter mode.

703. The terminal device transmits, on a physical uplink shared channel, the to-be-transmitted data and the demodulation reference signal obtained through FDSS processing.

704. After receiving the data and the demodulation reference signal that are transmitted by the terminal device, a network device demodulates the transmitted data and the demodulation reference signal.

A waveform used for the transmitted data and the demodulation reference signal is a discrete Fourier transform spread orthogonal frequency division multiplexing DFT-s-OFDM waveform. A modulation scheme for the transmitted data is π/2 binary phase shift keying BPSK modulation. The terminal device has performed frequency domain spectrum shaping FDSS processing on the transmitted data by using the first filter mode, and the terminal device has performed frequency domain spectrum shaping FDSS processing on the demodulation reference signal by using the second filter mode.

Figure 19:
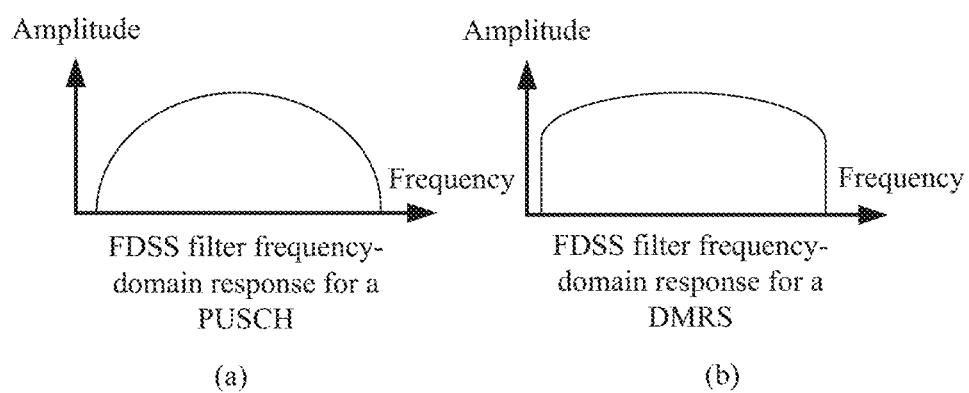
FIG. 19 is a schematic diagram of an FDSS filter frequency-domain response according to an embodiment of this application.

In an FDSS processing procedure, data or a signal is filtered, so that a PAPR of the data or the signal can be reduced. An objective of a DMRS is to perform channel estimation, and power on a subcarrier occupied by the DMRS should not be excessively low. Therefore, a frequency-domain response of a filter should be as flat as possible while a PAPR is reduced. However, an objective of performing FDSS processing on uplink data is mainly to reduce a PAPR. Therefore, a filter with a relatively high frequency-domain roll-off degree may be used to process uplink data, and a relatively flat filter is used to process a DMRS. FIG. 19 is a schematic diagram of frequency-domain responses of FDSS filters for uplink data and a DMRS. A filter with a relatively high roll-off degree is used for a PUSCH shown in (a) in FIG. 19. A relatively flat filter is used for a DMRS shown in (b) in FIG. 19.

Therefore, the first filter mode may be used to process uplink data, and the second filter mode is used to process a DMRS. In the first filter mode and the second filter mode, different filter parameters may be used for processing the uplink data and the DMRS, or different filter operation methods may be used for processing the uplink data and the DMRS, or filters with different filter effects may be used.

The performing, by the terminal device, frequency domain spectrum shaping FDSS processing on the to-be-transmitted data by using a first filter mode, and performing FDSS processing on the demodulation reference signal by using a second filter mode includes: determining, by the terminal device, a first filter parameter, where the first filter parameter is a filter parameter of the to-be-transmitted data determining, by the terminal device, a second filter parameter based on the first filter parameter, where the second filter parameter is a filter parameter of the demodulation reference signal, and a filter roll-off degree indicated by the second filter parameter is higher than a filter roll-off degree indicated by the first filter parameter; and filtering, by the terminal device, the to-be-transmitted data by using the first filter parameter, and filtering the demodulation reference signal by using the second filter parameter. The filter parameter may be a roll-off factor.

The filter parameter may be a roll-off factor. An ideal filter has a rectangular response curve, which cannot be achieved actually. Therefore, a transition band is generated between a passband and a stopband by using the roll-off factor. The roll-off factor determines a verticality of the transition band, in other words, a degree of approximation to a rectangular response. For example, a roll-off factor of the to-be-transmitted data is 0.5. If it is predetermined that a difference between the roll-off factor of the to-be-transmitted data and a roll-off factor of the DMRS is 0.3, because a roll-off degree of the to-be-transmitted data is higher than a roll-off degree of the DMRS, it can be determined that the roll-off factor of the DMRS is 0.5-0.3, that is, 0.2. Certainly, a correspondence between the roll-off factor of the to-be-transmitted data and the roll-off factor of the DMRS is not limited to that in the foregoing example, and may be a correspondence in another form.

The filter parameter, for example, the roll-off factor of the to-be-transmitted data, may be notified by a base station to the terminal device.

The foregoing describes the signal transmission method. The following describes a terminal device and a network device in the embodiments of this application with reference to the accompanying drawings.

Figure 20:
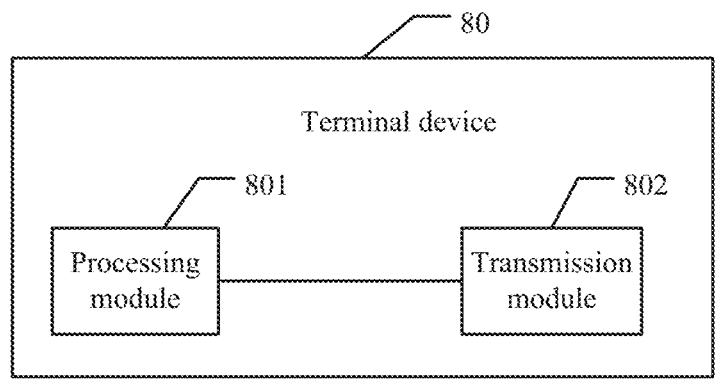
FIG. 20 is a schematic diagram of an embodiment of a terminal device according to the embodiments of this application.

As shown in FIG. 20, an embodiment of a terminal device 80 provided in the embodiments of this application includes:
a processing module 801, configured to:
obtain to-be-transmitted data, uplink control information, and a demodulation reference signal; and
map the to-be-transmitted data, the uplink control information, and the demodulation reference signal to generate multiplexed symbols, where the multiplexed symbols include discrete Fourier transform spread orthogonal frequency division multiplexing DFT-s-OFDM symbols or orthogonal frequency division multiplexing OFDM symbols, N first multiplexed symbols are located on one side or two sides of a second multiplexed symbol, a location relationship between each of the N first multiplexed symbols and the second multiplexed symbol satisfies a mapping condition, N is an integer greater than or equal to 1, the first multiplexed symbol is a multiplexed symbol to which the uplink control information is mapped, and the second multiplexed symbol is a multiplexed symbol to which the demodulation reference signal is mapped; and
a transmission module 802, configured to transmit the multiplexed symbols on a physical uplink shared channel.

In this embodiment of this application, the location relationship between the multiplexed symbol to which the UCI is mapped and the multiplexed symbol to which the DMRS is mapped needs to satisfy the mapping condition. In this way, UCI demodulation performance can be improved.

Optionally, that a location relationship between each of the N first multiplexed symbols and the second multiplexed symbol satisfies a mapping condition includes: the N first multiplexed symbols are multiplexed symbols closest to the second multiplexed symbol. Optionally, the processing module 801 is further configured to:

obtain a phase tracking signal, where the phase tracking signal is further mapped to the multiplexed symbols; and that a location relationship between each of the N first multiplexed symbols and the second multiplexed symbol satisfies a mapping condition includes:

the N first multiplexed symbols are multiplexed symbols to which the phase tracking signal is mapped and that are closest to the second multiplexed symbol.

Optionally, the processing module 801 is further configured to:

the first multiplexed symbol includes a plurality of modulated symbols, the plurality of modulated symbols include uplink control information modulated symbols and data modulated symbols, and the data modulated symbols include a modulated symbol to which the to-be-transmitted data is mapped, or the data modulated symbols include a modulated symbol to which the to-be-transmitted data is mapped and a modulated symbol to which the phase tracking reference signal is mapped; and when the multiplexed symbols are the OFDM symbols, the uplink control information modulated symbols are distributed in the plurality of modulated symbols at a uniform spacing.

Optionally, the processing module 801 is further configured to:

determine a modulation scheme for the uplink control information based on a modulation scheme for the to-be-transmitted data; and respectively modulate the to-be-transmitted data and the uplink control information based on the modulation scheme for the to-be-transmitted data and the modulation scheme for the uplink control information.

Optionally, if the multiplexed symbols are the DFT-s-OFDM symbols, when the to-be-transmitted data is modulated in a manner of π/2 binary phase shift keying BPSK, the modulation scheme for the uplink control information is the π/2 BPSK; or if the multiplexed symbols are the OFDM symbols, when the to-be-transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

Figure 21:
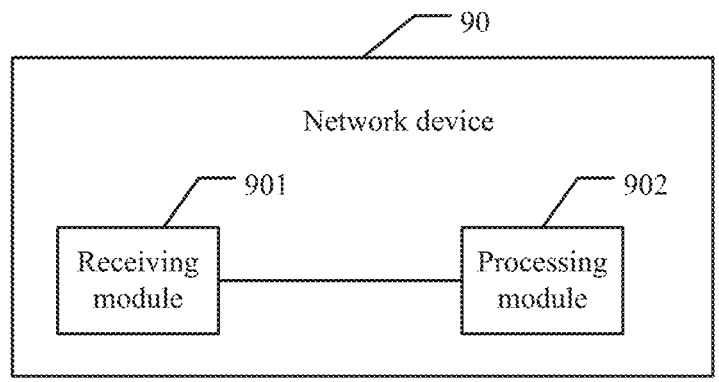
FIG. 21 is a schematic diagram of an embodiment of a network device according to the embodiments of this application.

Referring to FIG. 21, an embodiment of a network device 90 provided in the embodiments of this application includes:

a receiving module 901, configured to receive multiplexed symbols sent by a terminal device, where the multiplexed symbols include discrete Fourier transform spread orthogonal frequency division multiplexing DFT-s-OFDM symbols or orthogonal frequency division multiplexing OFDM symbols. N first multiplexed symbols are located on one side or two sides of a second multiplexed symbol, a location relationship between each of the N first multiplexed symbols and the second multiplexed symbol satisfies a mapping condition, N is an integer greater than or equal to 1, the first multiplexed symbol is a multiplexed symbol to which uplink control information is mapped, and the second multiplexed symbol is a multiplexed symbol to which a demodulation reference signal is mapped; and a processing module 902, configured to obtain, through demodulation and from the multiplexed symbols received by the receiving module 901, data, the uplink control information, and the demodulation reference signal that are transmitted by the terminal device.

Optionally, that a location relationship between each of the N first multiplexed symbols and the second multiplexed symbol satisfies a mapping condition includes:

the N first multiplexed symbols are multiplexed symbols closest to the second multiplexed symbol.

Optionally, that a location relationship between each of the N first multiplexed symbols and the second multiplexed symbol satisfies a mapping condition includes:

the N first multiplexed symbols are multiplexed symbols to which a phase tracking signal is mapped and that are closest to the second multiplexed symbol; and the processing module 902 is further configured to:

obtain the phase tracking signal from the multiplexed symbols through demodulation.

Optionally, the processing module 902 is further configured to:

determine a modulation scheme for the uplink control information based on a modulation scheme for the transmitted data; and obtain the transmitted data from the multiplexed symbols through demodulation based on the modulation scheme for the transmitted data, and obtain, from the first multiplexed symbol through demodulation based on the modulation scheme for the uplink control information, the uplink control information sent by the terminal device.

Optionally, if the multiplexed symbols are the DFT-s-OFDM symbols, when the transmitted data is modulated in a manner of π/2 binary phase shift keying BPSK, the modulation scheme for the uplink control information is the π/2 BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

The foregoing describes the terminal device and the network device corresponding to the embodiment of the signal transmission method corresponding to FIG. 6. With reference to FIG. 20 and FIG. 21, the following respectively describes a terminal device 80 and a network device 90 corresponding to the embodiments of the signal transmission methods in FIG. 15, FIG. 16, and FIG. 18.

An embodiment of the terminal device 80 corresponding to the embodiment of the signal transmission method corresponding to FIG. 15 includes:

a processing module 801, configured to:

obtain to-be-transmitted data and uplink control information;

determine a modulation scheme for the uplink control information based on a modulation scheme for the obtained to-be-transmitted data; and respectively modulate the to-be-transmitted data and the uplink control information based on the modulation scheme for the to-be-transmitted data and the determined modulation scheme for the uplink control information; and a transmission module 802, configured to transmit, on a physical uplink shared channel, the to-be-transmitted data and the control information modulated by a modulation module.

Optionally, if the multiplexed symbols are the DFT-s-OFDM symbols, when the transmitted data is modulated in a manner of π/2 binary phase shift keying BPSK, the modulation scheme for the uplink control information is the π/2 BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

An embodiment of the network device 90 corresponding to the embodiment of the signal transmission method corresponding to FIG. 15 includes:

a receiving module 901, configured to receive modulated transmitted data and uplink control information that are sent by a terminal device; and a processing module 902, configured to:

determine a modulation scheme for the uplink control information based on a modulation scheme for the transmitted data received by the receiving module; and demodulate the transmitted data based on the modulation scheme for the transmitted data, and demodulate the uplink control information based on the determined modulation scheme for the uplink control information.

Optionally, if the multiplexed symbols are the DFT-s-OFDM symbols, when the transmitted data is modulated in a manner of π/2 binary phase shift keying BPSK, the modulation scheme for the uplink control information is the π/2 BPSK; or if the multiplexed symbols are the OFDM symbols, when the transmitted data is modulated in a manner of quadrature amplitude modulation QAM, a modulation scheme for first-type information in the uplink control information is quadrature phase shift keying QPSK, where the first-type information includes at least one of a rank indicator RI and a hybrid automatic repeat request HARQ indication.

An embodiment of the terminal device 80 corresponding to the embodiment of the signal transmission method corresponding to FIG. 16 includes:

a processing module 801, configured to:

obtain to-be-transmitted data and a demodulation reference signal, where a waveform used for the to-be-transmitted data and the demodulation reference signal is a discrete Fourier transform spread orthogonal frequency division multiplexing DFT-s-OFDM waveform, and a modulation scheme for the to-be-transmitted data is π/2 binary phase shift keying BPSK modulation; and a transmission module 802, configured to transmit the obtained demodulation reference signal at first transmit power and transmit the to-be-transmitted data at second transmit power on a physical uplink shared channel, where there is an offset between the first transmit power and the second transmit power.

An embodiment of the network device 90 corresponding to the embodiment of the signal transmission method corresponding to FIG. 16 includes:

a receiving module 901, configured to receive modulated data and a modulated demodulation reference signal that are transmitted by a terminal device, where a waveform used for the transmitted data and the demodulation reference signal is a discrete Fourier transform spread orthogonal frequency division multiplexing DFT-s-OFDM waveform, and a modulation scheme for the transmitted data is π/2 binary phase shift keying BPSK modulation; and a processing module 902, configured to demodulate the transmitted data and the demodulation reference signal that are received by the receiving module 901.

An embodiment of the terminal device 80 corresponding to the embodiment of the signal transmission method corresponding to FIG. 18 includes:

a processing module 801, configured to:

obtain to-be-transmitted data and a demodulation reference signal, where a waveform used for the to-be-transmitted data and the demodulation reference signal is a discrete Fourier transform spread orthogonal frequency division multiplexing DFT-s-OFDM waveform, and a modulation scheme for the to-be-transmitted data is π/2 binary phase shift keying BPSK modulation; and perform frequency domain spectrum shaping FDSS processing on the obtained to-be-transmitted data by using a first filter mode, and perform FDSS processing on the demodulation reference signal by using a second filter mode, where a roll-off degree of the first filter mode is higher than a roll-off degree of the second filter mode; and a transmission module 802, configured to transmit, on a physical uplink shared channel, the to-be-transmitted data and the demodulation reference signal obtained by the processing module by performing FDSS processing.

Optionally, the processing module 801 is specifically configured to:

determine a first filter parameter, where the first filter parameter is a filter parameter of the to-be-transmitted data;

determine a second filter parameter based on the first filter parameter, where the second filter parameter is a filter parameter of the demodulation reference signal, and a filter roll-off degree indicated by the second filter parameter is higher than a filter roll-off degree indicated by the first filter parameter; and filter the to-be-transmitted data by using the first filter parameter, and filter the demodulation reference signal by using the second filter parameter.

An embodiment of the network device 90 corresponding to the embodiment of the signal transmission method corresponding to FIG. 18 includes: a receiving module 901, configured to receive data and a demodulation reference signal that are transmitted by a terminal device, where a waveform used for the transmitted data and the demodulation reference signal is a discrete Fourier transform spread orthogonal frequency division multiplexing DFT-s-OFDM waveform, a modulation scheme for the transmitted data is π/2 binary phase shift keying BPSK modulation, the terminal device has performed frequency domain spectrum shaping FDSS processing on the transmitted data by using a first filter mode, and the terminal device has performed frequency domain spectrum shaping FDSS processing on the demodulation reference signal by using a second filter mode; and a processing module 902, configured to demodulate the transmitted data and the demodulation reference signal.

The processing module 801 in the terminal device 80 and the processing module 902 in the network device 90 each may be a component such as the processor, the controller, the multiplexer, the mapper, the DFT processor, or the IFFT processor in the terminal device shown in FIG. 2 and FIG. 3. The transmission module 802 and the receiving module 901 each may be the antenna shown in FIG. 2 and FIG. 3.

Figure 22:
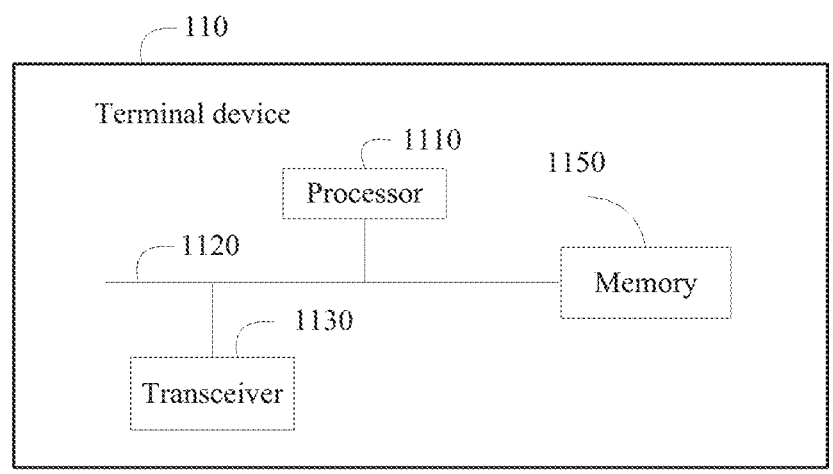
FIG. 22 is a schematic diagram of another embodiment of a terminal device according to the embodiments of this application.

To help understand functions of the components of the terminal device and the network device shown in FIG. 2 in a signal transmission process of this application, the following provides descriptions with reference to FIG. 22 by using a terminal device as an example.

FIG. 22 is a schematic structural diagram of a terminal device 110 according to an embodiment of this application. The terminal device 110 includes at least one processor 1110, a memory 1150, and a transceiver 1130. The transceiver may include a receiver and a transmitter. The memory 1150 may include a read-only memory and/or a random access memory, and provide an operation instruction and data for the processor 1110. A part of the memory 1150 may further include a non-volatile random access memory (NVRAM).

In some implementations, the memory 1150 stores the following elements: an executable module or a data structure, or a subset thereof, or an extended set thereof.

In this embodiment of this application, the operation instruction (the operation instruction may be stored on an operating system) stored in the memory 1150 is invoked to perform a corresponding operation. The processor 1110 controls an operation of the terminal device 110, and the processor 1110 may also be referred to as a CPU (central processing unit). The memory 1150 may include a read-only memory and a random access memory, and provide an instruction and data for the processor 1110. A part of the memory 1150 may further include anon-volatile random access memory (NVRAM). In specific application, the components of the terminal device 110 are coupled together by using a bus system 1120. In addition to a data bus, the bus system 1120 may include a power bus, a control bus, a status signal bus, and the like. However, for clarity of description, various types of buses in the figure are marked as the bus system 1120.

The methods disclosed in the foregoing embodiments of this application may be applied to the processor 1110, or implemented by the processor 1110. The processor 1110 may be an integrated circuit chip and has a signal processing capability. In an implementation process, the steps in the foregoing methods may be implemented by using a hardware integrated logic circuit in the processor 1110, or by using instructions in a form of software. The processor 1110 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly performed and accomplished by using a hardware decoding processor, or may be performed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1150. The memory 1150 may be a physically independent unit, or may be integrated with the processor 1110. The processor 1110 reads information from the memory 1150, and performs the steps of the foregoing methods in combination with hardware of the processor 1110.

Optionally, the transceiver 1130 is configured to perform a signal transmission step of the terminal device in the embodiments shown in FIG. 6 to FIG. 18.

The processor 1110 is configured to perform a signal processing step of the terminal device in the embodiments shown in FIG. 6 to FIG. 18.

A structure of a network device may also be understood with reference to FIG. 22. A corresponding transceiver and processor in the network device may perform corresponding receiving and processing steps of the network device in FIG. 6 to FIG. 18.

Figure 23:
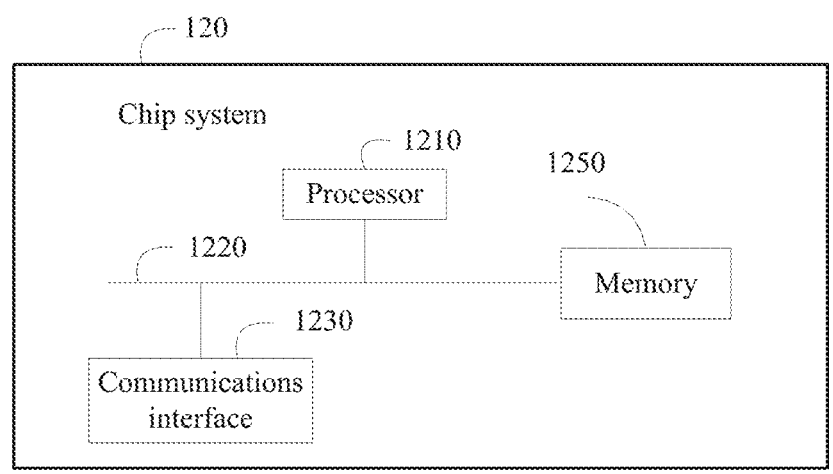
FIG. 23 is a schematic diagram of an embodiment of a chip system according to the embodiments of this application.

FIG. 23 is a schematic structural diagram of another implementation of a chip system 120 according to the embodiments of this application. The chip system 120 includes at least one processor 1210, a memory 1250, and a communications interface 1230. The memory 1250 may include a read-only memory and a random access memory, and provide an operation instruction and data for the processor 1210. A part of the memory 1250 may further include a non-volatile random access memory (NVRAM).

In some implementations, the memory 1250 stores the following elements: an executable module or a data structure, or a subset thereof, or an extended set thereof.

In this embodiment of this application, the operation instruction (the operation instruction may be stored on an operating system) stored in the memory 1250 is invoked to perform a corresponding operation.

In a possible implementation, a structure of the chip system is similar to that of a chip system used by a network device, but different apparatuses use different chip systems to implement respective functions.

The processor 1210 controls an operation of the chip system, and the processor 1210 may also be referred to as a CPU (central processing unit). The memory 1250 may include a read-only memory and a random access memory, and provide an instruction and data for the processor 1210. A part of the memory 1250 may further include a non-volatile random access memory (NVRAM). In specific application, the components of the chip system 120 are coupled together by using a bus system 1220. In addition to a data bus, the bus system 1220 may include a power bus, a control bus, a status signal bus, and the like. However, for clarity of description, various types of buses in the figure are marked as the bus system 1220.

The methods disclosed in the foregoing embodiments of this application may be applied to the processor 1210, or implemented by the processor 1210. The processor 1210 may be an integrated circuit chip and has a signal processing capability. In an implementation process, the steps in the foregoing methods may be implemented by using a hardware integrated logic circuit in the processor 1210, or by using instructions in a form of software. The processor 1210 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly performed and accomplished by using a hardware decoding processor, or may be performed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1250. The memory 1250 may be a physically independent unit, or may be integrated with the processor 1210. The processor 1210 reads information from the memory 1250, and performs the steps of the foregoing methods in combination with hardware of the processor 1210.

Optionally, the communications interface 1230 is configured to perform signal receiving and sending steps in the chip system or the network device in the embodiments shown in FIG. 6 to FIG. 18.

The processor 1210 is configured to perform a signal processing step of the chip system or the network device in the embodiments shown in FIG. 6 to FIG. 18.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of this application are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art can understand that all or some of the steps of the methods in the embodiments may be implemented by a program instructing related hardware. The program may be stored in a computer readable storage medium. The storage medium may include a ROM, a RAM, a magnetic disk, an optical disc, or the like.

The foregoing describes in detail the signal transmission method, the device, the computer readable storage medium, and the chip system provided in the embodiments of this application. This specification describes a principle and the implementations of this application by using specific examples. The foregoing embodiment descriptions are merely used to help understand the methods and core ideas of this application. In addition, a person of ordinary skill in the art may make modifications to the specific implementations and the application scope based on ideas of this application. To sum up, content of this specification shall not be understood as a limitation on this application.

The invention claimed is:

1. A signal transmission method, comprising:
obtaining, by a communication apparatus, a hybrid automatic repeat request (HARQ-ACK) and a modulation order for the HARQ-ACK;
encoding, by the communication apparatus, the HARQ-ACK to obtain encoded HARQ-ACK, based on a correspondence between the modulation order and the encoded HARQ-ACK;
wherein, if the HARQ-ACK is 1-bit HARQ-ACK and the modulation order is 1 that corresponds to a modulation scheme of π/2 binary phase shift keying (π/2-BPSK), the encoded HARQ-ACK is $[o_0^{ACK}]$ according to the correspondence between the modulation order and the encoded HARQ-ACK, wherein $o_0^{ACK}$ indicates a bit of the 1-bit HARQ-ACK; and
wherein, if the HARQ-ACK is 2-bit HARQ-ACK and the modulation order is 1 that corresponds to a modulation scheme of π/2 binary phase shift keying (π/2-BPSK), the encoded HARQ-ACK is $[o_0^{ACK}\ o_1^{ACK}\ o_2^{ACK}]$ according to the correspondence between the modulation order and the encoded HARQ-ACK, wherein $[o_0^{ACK}\ o_1^{ACK}]$ indicate bits of the 2-bit HARQ-ACK, and $o_2^{ACK}=(o_0^{ACK}+o_1^{ACK})\bmod 2$.

2. The method according to claim 1, further comprising:
obtaining, by the communication apparatus, to-be transmitted data;
encoding, by the communication apparatus, the to-be transmitted data to obtain encoded data; and
modulating, by the communication apparatus, the encoded data based on a modulation scheme for the encoded data, wherein the modulation scheme for the encoded data comprises one of the following:
π/2 binary phase shift keying (π/2 BPSK), quadrature phase shift keying (QPSK), 16 quadrature amplitude modulation (QAM), and 64QAM.

3. The method according to claim 2, wherein if the encoded data is modulated in a manner of the π/2 BPSK, the modulation scheme for the HARQ-ACK is the π/2 BPSK.

4. The method according to claim 2, wherein if the encoded data is modulated in a manner of the 16QAM or the 64QAM, the modulation scheme for the HARQ-ACK is QPSK.

5. The method according to claim 1, wherein, if the HARQ-ACK is 1-bit HARQ-ACK, the correspondence between the modulation order and the encoded HARQ-ACK is indicated by:

| $Q_m$ | Encoded HARQ-ACK |
|---|---|
| 1 | $[o_0^{ACK}]$ |
| 2 | $[o_0^{ACK}\ y]$ |
| 4 | $[o_0^{ACK}\ y\ x\ x]$ |
| 6 | $[o_0^{ACK}\ y\ x\ x\ x\ x]$ | wherein $Q_m$ represents the modulation order, the modulation orders 2, 4, and 6 respectively correspond to modulation schemes quadrature phase shift keying (QPSK), 16 quadrature amplitude modulation (QAM), and 64QAM, and y and x are placeholders.

6. The method according to claim 1, wherein, if the HARQ-ACK is 2-bit HARQ-ACK, the correspondence between the modulation order and the encoded HARQ-ACK is indicated by:

| $Q_m$ | Encoded HARQ-ACK |
|---|---|
| 1 | $[o_0^{ACK}\ o_1^{ACK}\ o_2^{ACK}]$ |
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ | wherein $Q_m$ represents the modulation order, the modulation orders 2, 4, and 6 respectively correspond to modulation schemes quadrature phase shift keying (QPSK), 16 quadrature amplitude modulation (QAM), and 64QAM, and y and x are placeholders.

7. A communication apparatus, comprising:
one or more processors; and
one or more memories coupled to the one or more processors and storing instructions for execution by the one or more processors, wherein the instructions cause the communication apparatus to:
obtain a hybrid automatic repeat request (HARQ-ACK) and a modulation order for the HARQ-ACK;
encode the HARQ-ACK to obtain encoded HARQ-ACK, based on a correspondence between the modulation order and the encoded HARQ-ACK;
wherein, if the HARQ-ACK is 1-bit HARQ-ACK and the modulation order is 1 that corresponds to a modulation scheme of π/2 binary phase shift keying (π/2-BPSK), the encoded HARQ-ACK is $[o_0^{ACK}]$ according to the correspondence between the modulation order and the encoded HARQ-ACK, wherein $o_0^{ACK}$ indicates a bit of the 1-bit HARQ-ACK; and
wherein, if the HARQ-ACK is 2-bit HARQ-ACK and the modulation order is 1 that corresponds to a modulation scheme of π/2 binary phase shift keying (π/2-BPSK), the encoded HARQ-ACK is $[o_0^{ACK}\ o_1^{ACK}\ o_2^{ACK}]$ according to the correspondence between the modulation order and the encoded HARQ-ACK, wherein $[o_0^{ACK}\ o_1^{ACK}]$ indicate bits of the 2-bit HARQ-ACK, and $o_2^{ACK}=(o_0^{ACK}+o_1^{ACK})\bmod 2$.

8. The communication apparatus according to claim 7, the instructions further cause the communication apparatus to:
obtain to-be transmitted data;
encode the to-be transmitted data to obtain encoded data; and
modulate the encoded data based on a modulation scheme for the encoded data, wherein the modulation scheme for the encoded data comprises one of the following:
π/2 binary phase shift keying (π/2 BPSK), quadrature phase shift keying (QPSK), 16 quadrature amplitude modulation (QAM), and 64QAM.

9. The communication apparatus according to claim 8, wherein if the encoded data is modulated in a manner of the π/2 BPSK, the modulation scheme for the HARQ-ACK is the π/2 BPSK.

10. The communication apparatus according to claim 8, wherein if the encoded data is modulated in a manner of the 16QAM or the 64QAM, the modulation scheme for the HARQ-ACK is the QPSK.

11. The communication apparatus according to claim 7, wherein, if the HARQ-ACK is 1-bit HARQ-ACK, the correspondence between the modulation order and the encoded HARQ-ACK is indicated by:

| $Q_m$ | Encoded HARQ-ACK |
|---|---|
| 1 | $[o_0^{ACK}]$ |
| 2 | $[o_0^{ACK}\ y]$ |
| 4 | $[o_0^{ACK}\ y\ x\ x]$ |
| 6 | $[o_0^{ACK}\ y\ x\ x\ x\ x]$ | wherein $Q_m$ represents the modulation order, the modulation orders 2, 4, and 6 respectively correspond to modulation schemes quadrature phase shift keying (QPSK), 16 quadrature amplitude modulation (QAM), and 64QAM, and y and x are placeholders.

12. The communication apparatus according to claim 7, wherein, if the HARQ-ACK is 2-bit HARQ-ACK, the correspondence between the modulation order and the encoded HARQ-ACK is indicated by:

| $Q_m$ | Encoded HARQ-ACK |
|---|---|
| 1 | $[o_0^{ACK}\ o_1^{ACK}\ o_2^{ACK}]$ |
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ | wherein $Q_m$ represents the modulation order, the modulation orders 2, 4, and 6 respectively correspond to modulation schemes quadrature phase shift keying (QPSK), 16 quadrature amplitude modulation (QAM), and 64QAM, and y and x are placeholders.

13. A non-transitory computer readable storage medium storing one or more instructions executable by one or more processors to perform a method, the method comprising:
obtaining, a hybrid automatic repeat request (HARQ-ACK) and a modulation order for the HARQ-ACK;
encoding, the HARQ-ACK to obtain encoded HARQ-ACK, based on a correspondence between the modulation order and the encoded HARQ-ACK;
wherein, if the HARQ-ACK is 1-bit HARQ-ACK and the modulation order is 1 that corresponds to a modulation scheme of π/2 binary phase shift keying (π/2-BPSK), the encoded HARQ-ACK is $[o_0^{ACK}]$ according to the correspondence between the modulation order and the ACK encoded HARQ-ACK, wherein $o_0^{ACK}$ indicates a bit of the 1-bit HARQ-ACK; and
wherein, if the HARQ-ACK is 2-bit HARQ-ACK and the modulation order is 1 that corresponds to a modulation scheme of π/2 binary phase shift keying (π/2-BPSK), the encoded HARQ-ACK is $[o_0^{ACK}\ o_1^{ACK}\ o_2^{ACK}]$ according to the correspondence between the modulation order and the encoded HARQ-ACK, wherein $[o_0^{ACK}\ o_1^{ACK}]$ indicate bits of the 2-bit HARQ-ACK, and $o_2^{ACK}=(o_0^{ACK}+o_1^{ACK})\bmod 2$.

14. The medium according to claim 13, wherein the method further comprising:
obtaining, to-be transmitted data;
encoding, the to-be transmitted data to obtain encoded data; and
modulating, the encoded data based on a modulation scheme for the encoded data, wherein the modulation scheme for the encoded data comprises one of the following:

π/2 binary phase shift keying (π/2 BPSK), quadrature phase shift keying (QPSK), 16 quadrature amplitude modulation (QAM), and 64QAM.

15. The medium according to claim 14, wherein if the encoded data is modulated in a manner of the π/2 BPSK, the modulation scheme for the HARQ-ACK is the π/2 BPSK.

16. The method according to claim 14, wherein if the encoded data is modulated in a manner of the 16QAM or the 64QAM, the modulation scheme for the HARQ-ACK is QPSK.

17. The medium according to claim 13, wherein, if the HARQ-ACK is 1-bit HARQ-ACK, the correspondence between the modulation order and the encoded HARQ-ACK is indicated by:

| $Q_m$ | Encoded HARQ-ACK |
|---|---|
| 1 | $[o_0^{ACK}]$ |
| 2 | $[o_0^{ACK}\ y]$ |
| 4 | $[o_0^{ACK}\ y\ x\ x]$ |
| 6 | $[o_0^{ACK}\ y\ x\ x\ x\ x]$ | wherein $Q_m$ represents the modulation order, the modulation orders 2, 4, and 6 respectively correspond to modulation schemes quadrature phase shift keying (QPSK), 16 quadrature amplitude modulation (QAM), and 64QAM, and y and x are placeholders.

18. The medium according to claim 13, wherein, if the HARQ-ACK is 2-bit HARQ-ACK, the correspondence between the modulation order and the encoded HARQ-ACK is indicated by:

| $Q_m$ | Encoded HARQ-ACK |
|---|---|
| 1 | $[o_0^{ACK}\ o_1^{ACK}\ o_2^{ACK}]$ |
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ | wherein $Q_m$ represents the modulation order, the modulation orders 2, 4, and 6 respectively correspond to modulation schemes quadrature phase shift keying (QPSK), 16 quadrature amplitude modulation (QAM), and 64QAM, and y and x are placeholders.

\* \* \* \* \*

UNITED STATES PATENT AND TRADEMARK OFFICE
CERTIFICATE OF CORRECTION

PATENT NO. : 12,113,659 B2
APPLICATION NO. : 17/403119
DATED : October 8, 2024
INVENTOR(S) : Fengwei Liu and Lei Chen Page 1 of 1

It is certified that error appears in the above-identified patent and that said Letters Patent is hereby corrected as shown below:

In the Claims

In Column 50, In Line 49, In Claim 13, before "encoded" delete "ACK".

Signed and Sealed this
Eleventh Day of February, 2025

Coke Morgan Stewart
*Acting Director of the United States Patent and Trademark Office*